United States Patent
Toner et al.

(10) Patent No.: US 11,477,981 B2
(45) Date of Patent: Oct. 25, 2022

(54) ICE NUCLEATION FORMULATIONS FOR CRYOPRESERVATION AND STABILIZATION OF BIOLOGICS

(71) Applicant: The General Hospital Corporation, Boston, MA (US)

(72) Inventors: Mehmet Toner, Charlestown, MA (US); Shannon N. Tessier, Cambridge, MA (US); Lindong Weng, Arlington, MA (US); Shannon L. Stott, Stoneham, MA (US)

(73) Assignee: The General Hospital Corporation, Boston, MA (US)

( * ) Notice: Subject to any disclaimer, the term of this patent is extended or adjusted under 35 U.S.C. 154(b) by 754 days.

(21) Appl. No.: 16/313,714

(22) PCT Filed: Jun. 29, 2017

(86) PCT No.: PCT/US2017/040012
§ 371 (c)(1),
(2) Date: Dec. 27, 2018

(87) PCT Pub. No.: WO2018/005802
PCT Pub. Date: Jan. 4, 2018

(65) Prior Publication Data
US 2020/0305415 A1    Oct. 1, 2020

Related U.S. Application Data

(60) Provisional application No. 62/471,265, filed on Mar. 14, 2017, provisional application No. 62/356,008, filed on Jun. 29, 2016.

(51) Int. Cl.
*A01N 1/02* (2006.01)

(52) U.S. Cl.
CPC ......... *A01N 1/0231* (2013.01); *A01N 1/0221* (2013.01); *A01N 1/0284* (2013.01)

(58) Field of Classification Search
CPC .................................................. A01N 1/0284
See application file for complete search history.

(56) References Cited

U.S. PATENT DOCUMENTS

| | | |
|---|---|---|
| 4,757,690 A | 7/1988 | Holowczenko et al. |
| 5,489,521 A | 2/1996 | So et al. |
| 6,673,607 B2 | 1/2004 | Toner et al. |
| 7,094,601 B2 | 8/2006 | Toner et al. |
| 8,222,193 B2 | 7/2012 | Tanaka et al. |
| 2015/0090623 A1 | 4/2015 | Grabiner et al. |

FOREIGN PATENT DOCUMENTS

| | | |
|---|---|---|
| CZ | 279735 | 6/1995 |
| EP | 2006296 | 12/2008 |
| JP | H 01-266185 | 10/1989 |
| JP | H 03-502402 | 6/1991 |
| JP | H 05-007489 | 1/1993 |
| JP | 2001-139599 | 5/2001 |
| JP | 2003-533192 | 11/2003 |
| JP | 2006-225315 | 8/2006 |
| JP | 2009-515200 | 4/2009 |
| JP | 2013-503350 | 1/2013 |
| WO | WO 89/06498 | 7/1989 |
| WO | WO 01/87062 | 11/2001 |
| WO | WO 2007/056727 | 5/2007 |
| WO | WO 2007/105731 | 7/2009 |
| WO | WO 2011/026020 | 3/2011 |
| WO | WO 2016/033695 | 3/2016 |
| WO | WO 2017/196548 | 11/2017 |

OTHER PUBLICATIONS

Wolber et al. PNAS, 1986, 83:7256-7260.*
JP Office Action in Japanese Appln. No. 2018-568442, dated Feb. 2, 2021, 13 pages (with English translation).
Kojima et al., "Induction of Ice Nucleation by Silver Iodide in Cryopreservation of Mammalian Embryos," Japanese Journal of Freezing and Drying, 1988, 34:93-99.
Mihara et al., "MRI, Magnetic Resonance Influenced, organ freezing method under magnetic field," Academic Collaborations for Sick Children, 2009, 1(1):8-11 (with Machine Translation).
Stöckel et al., "Rates of Homogeneous Ice Nucleation in Levitated H2O and D2O Droplets," J. Phys. Chem. A, 2005, 109(11):2540-2546.
Baran & Ware., "Cryopreservation of rhesus macaque embryonic stem cells," Stem Cells Dev., Apr. 2007, 16(2):339-344.
Budke and Koop, "Binary: An Optical Freezing Array for Assessing Temperature and Time Dependence of Heterogeneous Ice Nucleation," Atoms. Meas. Tech, Feb. 2015, 8: 689-703.
Choi et al., "Anomalous thermal conductivity enhancement in nanotube suspensions," Applied Physics Letter, Oct. 2001, 79:2252-2254.
Cochet & Widehem, "Ice crystallization by Pseudomonas syringae," Appl. Microbiol. Biotechnol., Aug. 2000, 54(2):153-161.
Dalvi-Isfahan et al., "Review on the control of ice nucleation by ultrasound waves, electric and magnetic fields," J. Food Eng., Feb. 2017, 195:222-234.
Eastman et al., "Anomalously increased effective thermal conductivities of ethylene glycol-based nanofluids containing copper nanoparticles," Applied Physics Letter, Feb. 2001, 78:718-720.
Edwards et al., "Ice nucleation by monodisperse silver iodide particles," J. Colloid. Sci., Oct. 1962, 17(8):749-758.
Enright. "Heavy water slows biological timing processes," Z. vergl. Physiologie., Mar. 1971, 72(1):1-16.
EP Extended European Search Report in EP Appln. No. 17821252.8, dated Jan. 13, 2020, 8 pages.
Fahy et al., "Cryopreservation of complex systems: the missing link in the regenerative medicine supply chain," Rejuvenation Res., Jun. 2006, 9(2):279-291.

(Continued)

Primary Examiner — Bin Shen
(74) Attorney, Agent, or Firm — Fish & Richardson P.C.

(57) ABSTRACT

This disclosure relates to ice nucleation formulations for cryopreservation and stabilization of biologics, and methods of use thereof.

19 Claims, 10 Drawing Sheets

Specification includes a Sequence Listing.

(56) References Cited

OTHER PUBLICATIONS

Fuller, "Cryoprotectants: the essential antifreezes to protect life in the frozen state," Cryo. Letters, Nov. 2004, 25(6)375-388.
Garbayo et al., "Diffusion characteristics of nitrate and glycerol in alginate," Colloids Surf., B, May 2002, 25(1):1-9.
Geidobler & Winter, "Controlled ice nucleation in the field of freeze-drying: fundamentals and technology review," Eur. J. Pharm. Biopharm., Oct. 2013, 85(2):214-222.
Geidobler et al., "Can Controlled Ice Nucleation Improve Freeze-Drying of Highly-Concentrated Protein Formulations?," J. Pharm. Sci., Nov. 2013, 102(11):3915-3919.
Gurian-Sherman & Lindow., "Bacterial ice nucleation: significance and molecular basis," FASEB J., Oct. 1993, 7(14):1338-1343.
Han et al., "Effects of nanoparticles on the nucleation and devitrification temperatures of polyol cryoprotectant solutions," Microfluid Nanofluidics, Apr. 2008, 4(4):357-361.
Harris et al., "Cryopreservation of isolated hepatocytes: intracellular ice formation under various chemical and physical conditions," Cryobiology, 28(5):436-444.
Hua et al., "pH-sensitive sodium alginate/poly (vinyl alcohol) hydrogel beads prepared by combined Ca2+ crosslinking and freeze-thawing cycles for controlled release of diclofenac sodium," Int. J. Biol. Macromolec., Jun. 2010, 46 (5):517-523.
Ikeda et al., "Examination of microgravity effects on spontaneous Ca2+ oscillations in AtT20 pituitary cells using heavy water," J. Gravit. Physiol., Jul. 2000, 7(2):P63-64.
International Preliminary Report on Patentability in International Application No. PCT/US2017/040012, dated Jan. 10, 2019, 22 pages.
International Search Report and Written Opinion in International Application No. PCT/US2017/040012, dated Dec. 5, 2017, 32 pages.
Kiani et al., "Investigation of the effect of power ultrasound on the nucleation of water during freezing of agar gel samples in tubing vials," Ultrason Sonochem, May 2012, 19(3):576-581.
Kushner et al., "Pharmacological uses and perspectives of heavy water and deuterated compounds," Can. J. Physiol. Pharmacol., Feb. 1999, 77(2):79-88.
Lanza et al., "Generation of histocompatible tissues using nuclear transplantation," Nat. Biotechnol., Jul. 2002, 20(7):689-696.
Lee et al., "Survival of freeze-dried Lactobacillus bulgaricus KFRI 673 in chitosan-coated calcium alginate microparticles," J. Agric. Food Chem., Dec. 2004, 52(24):7300-7305.
Lin et al., "Modification of membrane function, protein synthesis, and heat killing effect in cultured Chinese hamster cells by glycerol and D2O1," Cancer Res., Dec. 1984; 44(12 Pt 1):5776-5784.
Lüönd et al., "Experimental study on the ice nucleation ability of size-selected kaolinite particles in the immersion mode," J. Geophys. Res. Atmos., Jul. 2010, 115(D14).
Massie, "Development of an Optimised Cryopreservation Protocol for Encapsulated Liver Cell Spheroids: Towards Delivery of A Bioartifical Liver," Thesis for the Degree of Doctor of Philosophy (PhD), University College LofKlon (UCL) Centre for Hepatology: Royal Free Campus: Department of Medicine, 2011, Abstract; p. 3; p. 25—Section 1.1.2.1; p. 26, First Paragraph; p. 31, Section 1.3.2; p. 41—Sections 1.4.5, 1.4.5.1; p. 33—Section 1.4.1.1; p. 42, Third Paragraph—1.4.6.1; p. 43, Section 1.4 .62; p. 59, Method Section—5.1.1.1. 1.1; p. 74, First Paragraph; Figure 2-5; p. 84, Section 3.3.4; p. 92—Section 3,4.4.2; p. 93, Figure 3-12 p. 112, Third Paragraph;; p. 114, Second Paragraph; p. 115, First Paragraph; P31J8 161, Table 5-1; p. 162 •Section 5.3.4; p. 177, Sections 5.4.5.2, 5.4.5.2.1; p. 182, Second Paragraph.
Morris & Acton, "Controlled ice nucleation in cryopreservation—a review," Cryobiology, Apr. 2013, 66(2):85-92.
Murray et al., "Ice nucleation by particles immersed in supercooled cloud droplets," Chem. Soc. Rev., 2012, 41(19):6519-6554.
Nindiyasari et al., "The Effect of Hydrogel Matrices on Calcite Crystal Growth Morphology, Aggregate Formation, and Co-Orientation in Biomimetic Experiments and Biomineralization Environments," Department fur Geo- und Umweltwissenchaften. Ludwig-Maximilians-Universitat, Munich, Germany, Apr. 2015, 7 pages.
Orlowska et al., "Controlled ice nucleation under high voltage DC electrostatic field conditions," Food Res. Int., 42(7):879-884.
Pandey et al., "Ice-nucleating bacteria control the order and dynamics of interfacial water," Sci. Adv., Apr. 2016, 2(4):e1501630.
Petersen et al., "A new approach for freezing of aqueous solutions under active control of the nucleation temperature," Cryobiology, 53(2): 248-257.
Riechers et al., "The homogeneous ice nucleation rate of water droplets produced in a microfluidic device and the role of temperature uncertainty," Phys. Chem. Chem. Phys., 2013, 15(16):5873-5887.
Stöckel et al., "Rates of homogeneous ice nucleation in levitated H2O and D2O droplets," J. Phys. Chem. A., Mar. 2005, 109(11):2540-2546.
Trad et al., "Effects of cryoprotectants and ice-seeding temperature on intracellular freezing and survival of human oocytes," Hum. Reprod., Jun. 1999, 14(6):1569-1577.
Verheyden et al., "Capsid and RNA stabilisation of the oral polio vaccine," Vaccine, Feb. 2001, 19(15-16):1899-1905.
Vonnegut, "The nucleation of ice formation by silver iodide," J. Appl. Phys., Jul. 1947, 18(7):593-595.
Wakayama et al., "Successful transplantation of rat hearts subjected to extended cold preservation with a novel preservation solution," Transpl. Int., Jun. 2012, 25(6):696-706.
Weng et al., "Bacterial Ice Nucleation in Monodisperse D2O and H2O-in-Oil Emulsions," Langmuir, Sep. 2016, 32(36):9229-9236.
Whale et al., "Ice Nucleation Properties of Oxidized Carbon Nanomaterials," J. Phys. Chem. Lett., Aug. 2015, 6(15):3012-3016.
Wolanczyk et al., "Ice nucleating activity in the blood of the freeze-tolerant frog, Rana sylvatica," Cryobiology, Jun. 1990, 27(3):328-335.
Wolber & Green., "Detection of bacteria by transduction of ice nucleation genes," Trends Biotechnol., 1990, 8(10):276-279.
Xu et al., "Influence of power ultrasound on ice nucleation of radish cylinders during ultrasound-assisted immersion freezing," Int. J. Refrig., Oct. 2014, 46:1-8.
Zachariassen & Kristiansen, "Ice nucleation and antinucleation in nature," Cryobiology, Dec. 2000, 41(4):257-279.
Zamecnik et al., "Ice nucleation by immobilized ice nucleation active bacteria," Cryo Letters, 1991, 12(3):149-154.
JP Office Action in Japanese Appln. No. 2018-568442, dated Sep. 28, 2021, 9 pages (with English translation).

\* cited by examiner

FIGS. 1A-F

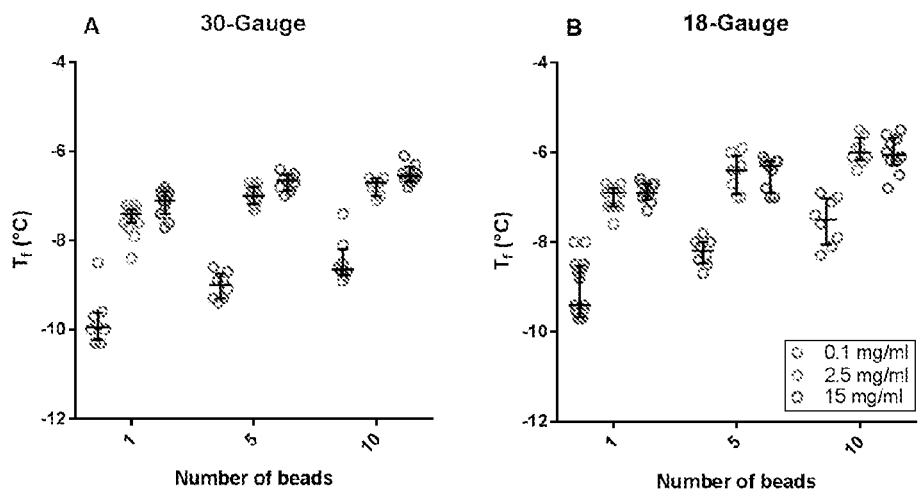
FIGs. 3A-B
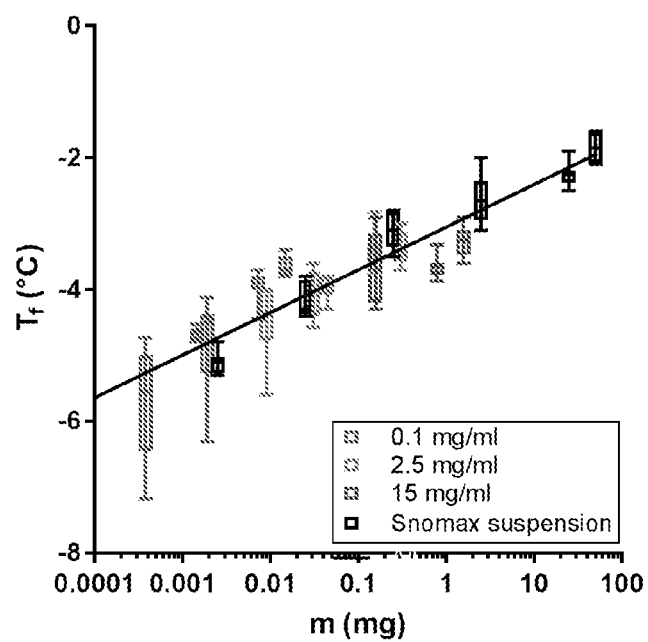
FIG. 4

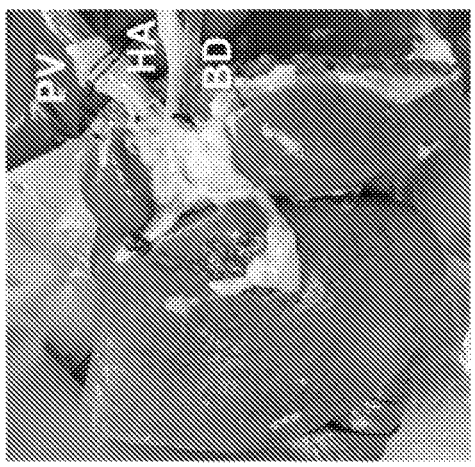
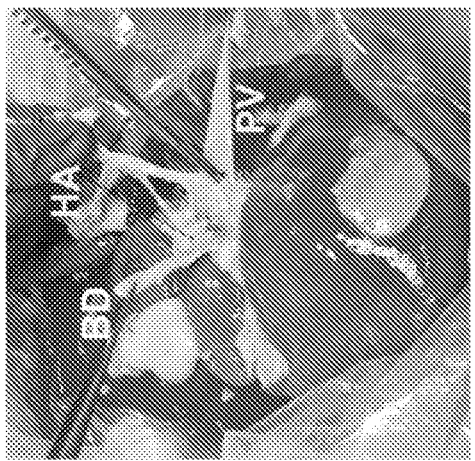
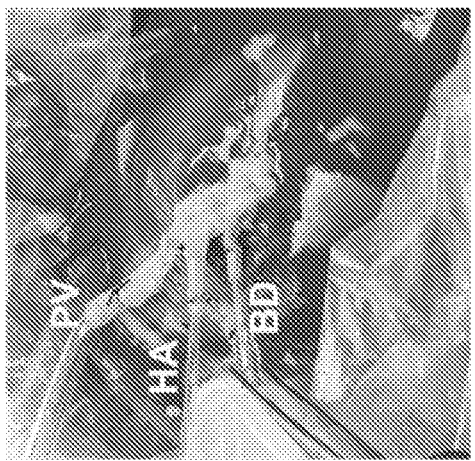
FIG. 13A

FIG. 14

```
SEQ ID NO: 1
Ice nucleation protein InaZ; P06620-1

10         20         30         40         50
    MNLDKALVLR TCANNMADHC GLIWPASGTV ESRYWQSTRR HENGLVGLLW
            60         70         80         90        100
    GAGTSAFLSV HADARWIVCE VAVADIISLE EPGMVKFPRA EVVHVGDRIS
           110        120        130        140        150
    ASHFISARQA DPASTSTSTL TPMPTAIPTP MPAVASVTLP VAEQARHEVF
           160        170        180        190        200
    DVASVSAAAA PVNTLPVTTP QNVQTATYGS TLSGDNHSRL IAGYGSNETA
           210        220        230        240        250
    GNHSDLIAGY GSTGTAGSDS WLVAGYGSTQ TAGGDSALTA GYGSTQTARE
           260        270        280        290        300
    GSNLTAGYGS TGTAGSDSSL IAGYGSTQTS GGDSSLTAGY GSTQTAQEGS
           310        320        330        340        350
    NLTAGYGSTG TAGSDSSLIA GYGSTQTSGG DSSLTAGYGS TQTAQEGSNL
           360        370        380        390        400
    TAGYGSTGTA GVDSSLIAGY GSTQTSGSDS ALTAGYGSTQ TAQEGSNLTA
           410        420        430        440        450
    GYGSTGTAGS DSSLIAGYGS TQTSGSDSSL TAGYGSTQTA QEGSILTAGY
           460        470        480        490        500
    GSTGTAGVDS SLIAGYGSTQ TSGSDSALTA GYGSTQTAQE GSNLTAGYGS
           510        520        530        540        550
    TGTAGADSSL IAGYGSTQTS GSESSLTAGY GSTQTAREGS TLTAGYGSTG
           560        570        580        590        600
    TAGADSSLIA GYGSTQTSGS ESSLTAGYGS TQTAQQGSVL TSGYGSTQTA
           610        620        630        640        650
    GAASNLTTGY GSTGTAGHES FIIAGYGSTQ TAGHKSILTA GYGSTQTARD
           660        670        680        690        700
    GSDLIAGYGS TGTAGSGSSL IAGYGSTQTA SYRSMLTAGY GSTQTAREHS
           710        720        730        740        750
    DLVTGYGSTS TAGSNSSLIA GYGSTQTAGF KSILTAGYGS TQTAQERTSL
           760        770        780        790        800
    VAGYGSTSTA GYSSSLIAGY GSTQTAGYES TLTAGYGSTQ TAQENSSLTT
           810        820        830        840        850
    GYGSTSTAGY SSSLIAGYGS TQTAGYESTL TAGYGSTQTA QERSDLVTGY
           860        870        880        890        900
    GSTSTAGYAS SLIAGYGSTQ TAGYESTLTA GYGSTQTAQE NSSLTTGYGS
           910        920        930        940        950
    TSTAGFASSL ISGYGSTQTA GYKSTLTAGY GSTQTAEYGS SLTAGYGSTA
           960        970        980        990       1000
    TAGQDSSLIA GYGSSLTSGI RSFLTAGYGS TLIAGLRSVL IAGYGSSLTS
          1010       1020       1030       1040       1050
    GVRSTLTAGY GSNQIASYGS SLIAGHESIQ VAGNKSMLIA GKGSSQTAGF
          1060       1070       1080       1090       1100
    RSTLIAGAGS VQLAGDRSRL IAGADSNQTA GDRSKLLAGN NSYLTAGDRS
          1110       1120       1130       1140       1150
    KLTGGHDCTL MAGDQSRLTA GKNSVLTAGA RSKLIGSEGS TLSAGEDSIL
          1160       1170       1180       1190       1200
    IFRLWDGKRY RQLVARTGEN GVEADIPYYV NEDDDIVDKP DEDDDWIEVK
```

ICE NUCLEATION FORMULATIONS FOR CRYOPRESERVATION AND STABILIZATION OF BIOLOGICS

CLAIM OF PRIORITY

This application is the national stage application of International Application No. PCT/0S2017/040012, filed on Jun. 29, 2017, which claims the benefit of U.S. Provisional Application Ser. No. 62/356,008, filed on Jun. 29, 2016, and U.S. Provisional Application Ser. No. 62/471,265, filed on Mar. 14, 2017. The entire contents of the foregoing are incorporated herein by reference.

FEDERALLY SPONSORED RESEARCH OR DEVELOPMENT

This invention was made with Government support under Grant No. EB002503 awarded by the National Institutes of Health and Grant No. H151-013-0141 awarded by the Department of Defense. The Government has certain rights in the invention.

TECHNICAL FIELD

This disclosure relates to ice nucleation formulations for cryopreservation and stabilization of biologics, and methods of use thereof.

BACKGROUND

Without external nuclei, water and aqueous solutions will maintain a supercooled liquid state well below the melting point until homogeneous ice nucleation occurs. For instance, homogeneous ice nucleation of pure water typically occurs in the range of −35 to −38° C., depending on the cooling rate and the sample volume. However, the initiation of ice nucleation at a relatively higher subzero temperature offers many benefits for a wide range of process technologies. For example, during the freeze-drying of food products and pharmaceuticals, controlled ice nucleation with suppressed supercooling can significantly decrease the primary drying time and improve food texturing and product uniformity. In slow-freezing cryopreservation of isolated rat hepatocytes and human oocytes, a higher ice nucleation temperature in the extracellular space also reduces the probability of detrimental intracellular ice formation (IIF). Thus, there is a need to develop methods to minimize the supercooling effect (i.e., the difference between the ice nucleation temperature and the melting point), and initiate ice nucleation at relatively high subzero temperatures.

SUMMARY

This disclosure relates to ice nucleation formulations for cryopreservation and stabilization of biologics, and methods of use thereof.

In one aspect, the disclosure provides hydrogel particles containing an ice nucleating agent, wherein the ice nucleating agent is enclosed within the hydrogel particles.

In some embodiments, the ice nucleating agent is SNOMAX® or silver iodide. The ice nucleating agent can also be a protein, a carbohydrate, or a phospholipid. The concentration of the ice nucleating agent in the hydrogel particle can be greater than 0.5 mg/ml, 1 mg/ml, or 2 mg/ml.

In some embodiments, the hydrogel particle is an agarose hydrogel particle, or an alginate hydrogel particle.

In some embodiments, the hydrogel particle has a diameter less than 4 mm, less than 3 mm, or less than 2 mm. In some embodiments, the hydrogel particle can have a volume less than 15 or less than 5 μl.

In some embodiments, the hydrogel particle further contains heavy water (e.g., $D_2O$ or $T_2O$).

In some embodiments, the hydrogel particle can further include a cryoprotectant (e.g., DMSO, EG, PROH, 3-OMG, or glycerol).

In some embodiments, the hydrogel particle can increase the ice nucleation temperature of a sample to higher than −8° C. or higher than −5° C. In some embodiments, the hydrogel particle reduces the range of the ice nucleation temperatures of a plurality of samples.

In one aspect, the disclosure also provides compositions comprising a hydrogel particle and an ice nucleating agent, wherein the ice nucleating agent is enclosed in the hydrogel particle.

In some embodiments, the ice nucleating agent is SNOMAX or silver iodide. The ice nucleating agent can also be a protein, a carbohydrate, or a phospholipid. The concentration of the ice nucleating agent in the hydrogel particle can be greater than 0.5 mg/ml, 1 mg/ml, or 2 mg/ml.

In some embodiments, the hydrogel particle is an agarose hydrogel particle, or an alginate hydrogel particle.

In some embodiments, the hydrogel particle has a diameter less than 4 mm, less than 3 mm, or less than 2 mm. In some embodiments, the hydrogel particle can have a volume less than 15 μl, or less than 5 μl.

In some embodiments, the composition can further include a cryoprotectant (e.g., DMSO, EG, PROH, 3-OMG, or glycerol). In some embodiments, the composition can further include heavy water (e.g., $D_2O$ or $T_2O$). In some embodiments, the composition can further include a preservative.

In another aspect, the disclosure also provides a composition containing heavy water (e.g., $D_2O$ or $T_2O$) and an ice nucleating agent. In some embodiments, the weight percentage of heavy water in the composition can be over 10%, 50%, or 75%. In some embodiments, the percentage of heavy water within the water content (v/v) is over 10%, 50%, or 75%.

In some embodiments, the ice nucleating agent is SNOMAX, ice nucleating bacteria, silver iodide, mineral particles, or nanoparticles. In some embodiments, the ice nucleating agent is a protein, a carbohydrate, or a phospholipid.

In some embodiments, the composition can further include a cryoprotectant (e.g., DMSO, EG, PROH, 3-OMG, or glycerol). In some embodiments, the cryoprotectant is a non-penetrating cryoprotectant. In some embodiments, the cryoprotectant is sucrose, trehalose, stachyose, raffinose, or polymers (e.g., PEG, PVA, HES).

In some embodiments, the composition can further include a preservative.

In one aspect, the disclosure also provides methods of preserving a biological sample. The methods include the steps of contacting the biological sample with the compositions as described herein; and freezing the biological sample with the composition. In some embodiments, the methods further include the step of thawing the biological sample. The biological sample can include cells, tissue samples, exosomes or microvesicles.

In one aspect, the disclosure relates to methods of preserving an organ. The methods include the steps of perfusing or contacting the organ with the composition as described herein; and freezing the organ in the presence of the composition. In some embodiments, the methods further include the steps of thawing the organ. The organ can be a liver, a heart, or a kidney. In some embodiments, the methods minimize ischemia-reperfusion damage.

In another aspect, the disclosure also provides freezing systems. The freezing systems have a surface and an ice nucleating agent, wherein the ice nucleating agent is immobilized on the surface. In some embodiments, the freezing system includes a bag, a plastic vial, a glass vial, a plastic straw, a pulled straw, a capillary tube or straw, or a bioreactor.

The disclosure also relates to freezing systems having a surface and a hydrogel particle as described herein, wherein the hydrogel particle is immobilized on the surface. In some embodiments, the freezing system includes a bag, a plastic vial, a glass vial, a plastic straw, a pulled straw, a capillary tube or straw, or a bioreactor.

In one aspect, the disclosure also provides a freezing system. The freezing system contains the hydrogel particles as described herein and/or the compositions as described herein. In some embodiments, the freezing system includes a bag, a plastic vial, a glass vial, a plastic straw, a pulled straw, a capillary tube or straw, or a bioreactor.

In another aspect, the disclosure relates to methods of producing a hydrogel particle composition that has a desired ice nucleation temperature. The methods include the steps of:
 (1). selecting a desired ice nucleation temperature;
 (2). determining, from a predetermined curve, a target total mass of an ice nucleating agent in a hydrogel particle composition, wherein the predetermined curve correlates ice nucleation temperature and total mass of the ice nucleating agent for a plurality of sample hydrogel particle compositions;
 (3). determining the values of N, V and $c_{local}$ of the hydrogel particle composition based on the target total mass; and
 (4). producing a hydrogel particle composition having the determined values of N, V and $c_{local}$.

In one aspect, the disclosure also provides methods of producing a heavy water composition comprising an ice nucleating agent that has a desired ice nucleation temperature. The methods include the steps of
 (1). selecting a desired ice nucleation temperature;
 (2). determining, from a predetermined curve, a heavy water concentration, wherein the predetermined curve correlates ice nucleation temperature and heavy water concentration for a plurality of sample heavy water compositions, each comprising the ice nucleating agent;
 (3). producing a heavy water composition having the determined heavy water concentration and comprising the ice nucleating agent.

The present disclosure further provides the application of $D_2O$, ice nucleating agents, and/or other preservatives for the purpose of preservation/stabilization of samples containing biologicals including cell-free molecules (DNA, RNA, proteins, etc.), cell-derived vesicles (e.g. exosomes and microvesicles), liposomes and other vehicles for administration of nutrients/pharmaceuticals, cells, organs, and full organisms.

In some embodiments, the disclosure relates to the addition of $D_2O$ together with an ice-nucleating agent and other preservatives to seed ice in solutions, and/or the addition of $D_2O$ together with an ice-nucleating agent and other preservatives to seed ice in solutions to decrease sample variability of biologicals.

In some embodiments, the addition of $D_2O$ together with an ice-nucleating agent can extend the length of preservation times for cells, organs, or other biologicals, as well as minimize ischemia-reperfusion damage and other injurious effects as a result of preservation.

In some embodiments, the ice nucleating agent can be chosen from one of many known agents including but not limited to SNOMAX and other ice nucleating bacteria, silver iodide, mineral particles, nanoparticles, naturally occurring ice nucleating agents in both animals and plants, ice nucleating agents composed of proteins, carbohydrates, and/or phospholipids, etc.

In some embodiments, the solutions include solutes of interest in cryopreservation including but not limited to penetrating cryoprotectants such as DMSO, EG, PROH, 3-OMG, glycerol, etc., as well as non-penetrating cryoprotectants such as sucrose, trehalose, stachyose, raffinose, polymers (e.g. PEG, PVA, HES), etc. In some embodiments, the solutions include cocktails of multiple cryoprotectants.

In some embodiments, the $D_2O$ concentration might be 100%, 75%, 50%, 25% or any other concentration within this range. In some embodiments, the $D_2O$ concentration is higher than 10%.

The present disclosure also provides freezing systems. The freezing system can be a bag, plastic vial, glass vial, plastic straws, pulled straws, capillary tubes or straws, bioreactors, or other materials containing cells to be cryopreserved.

In some embodiments, the ice nucleating agents are added to the solution or immobilized on the surface of the freezing system.

In some embodiments, the nucleating agents are encapsulated in a droplet of hydrogel.

In some embodiments, the biological samples are suspended cells, samples from tissue engineered cellular systems, cultured cells, co-cultures of cells, tissues, pieces of tissues, and/or organs.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIG. 1A. The preparation of alginate beads by the ionotropic gelation method using calcium chloride as a cross-linking agent.

FIG. 1B. The freezing temperature measurement of a 0.5 ml aqueous sample subjected to the 1° C./min cooling ramp.

FIG. 1C. The temperature profiles of 0.5 ml 10% glycerol solution alone (black) and 0.5 ml 10% glycerol containing ten alginate beads (prepared by 18-gauge needle) and encapsulating 15 mg/ml SNOMAX (gray).

FIG. 1D. Two alginate beads prepared by 18-gauge needle and encapsulating 0.1 mg/ml (left) and 15 mg/ml (right) SNOMAX, respectively (the grid has a dimension of 12.7 mm×12.7 mm).

FIG. 1E. A SNOMAX-free alginate bead before frozen.

FIG. 1F. A SNOMAX-free alginate bead after freeze-thawed.

FIG. 3A. The freezing temperature ($T_f$) of aqueous 10% glycerol in the presence of alginate beads containing different local concentrations of SNOMAX (0.1, 2.5, or 15 mg/ml). The beads were generated by a 30-gauge needle.

FIG. 3B. The freezing temperature ($T_f$) of aqueous 10% glycerol in the presence of alginate beads containing different local concentrations of SNOMAX (0.1, 2.5, or 15 mg/ml). The beads were generated by an 18-gauge needle.

FIG. 4. The freezing temperature ($T_f$) profile that is plotted as a function of the total mass of SNOMAX (m) existing in 0.5 ml WFI water. The dark black data points correspond to the freezing temperatures of the SNOMAX suspensions of 0.005-100 mg/ml. The curve that best fits all the data points is $T_f=0.6478 \cdot \log_{10} m - 3.052$ ($R^2=0.9019$) as represented by the solid line.

FIG. 13A. An overview of the back table separation and machine perfusion of a split human liver graft.

FIG. 14 shows the sequence of Pseudomonas syringae InaZ.

DETAILED DESCRIPTION

Figure 2A:
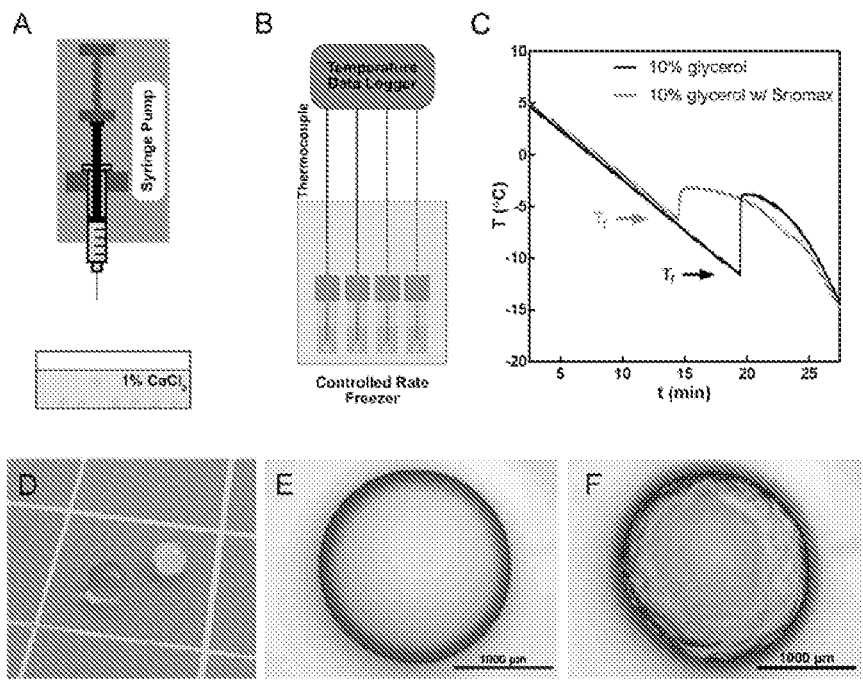
FIG. 2A. The freezing temperature ($T_f$) of WFI water (water for Injection) in the presence of alginate beads containing different local concentrations of SNOMAX (0.1 or 2.5 mg/ml). The beads were generated by a 30-gauge needle.

The control of ice nucleation is of fundamental significance in many process technologies related to food and pharmaceutical science and cryobiology. Mechanical perturbation, and electromagnetic fields have been known to induce ice nucleation in a controlled manner. These ice-nucleating methods suffer from a number of disadvantages such as the lack of consistency and standardization in the case of manual operations, the cumbersome process for a large number of samples, and the necessity of electric and/or magnetic fields.

It is generally suggested that ice nucleating agents (INA) induce ice nucleation heterogeneously because the microscopic structure of the INA particle surface resembles the ice crystalline structure. One of the major advantages of INAs is their self-ice-seeding capability, that is, heterogeneously initiating ice formation at their characteristic temperatures without manual or instrumental interruptions. But the use of INAs in biological systems may introduce concerns about their biocompatibility, degradability, toxicity, recovery and ease of use. It is therefore desirable to minimize the direct contact between foreign ice nuclei and biological components in order to avoid the potential toxicity and contamination. In addition, the recovery of used INA particles may also facilitate the downstream processing. Hydrogel encapsulation can provide a promising path to realize these ends.

This disclosure provides, e.g., a model ice-nucleating agent, encapsulated in microliter-sized alginate beads. This disclosure evaluates the performance of the bacterial hydrogel beads to initiate ice nucleation in water and aqueous glycerol solution by investigating factors that affect ice nucleation temperature, e.g., the size and number of the beads and the local concentration of INA particles. In the aqueous sample of a fixed volume, the total mass of the INA particles (m) is found to be the governing parameter that is responsible for determining the ice nucleation performance of the bacterial hydrogel beads. The freezing temperature has a strong positive linear correlation with $\log_{10} m$. The findings provide an effective, predictable approach to control ice nucleation, which can improve the outcome and standardization of many ice-assisted process technologies.

This disclosure has also systematically investigated the ice nucleation kinetics of picoliter-sized drops of heavy water (e.g., $D_2O$ or $T_2O$) and light water ($H_2O$) mixtures with freeze-dried P. syringae. The results showed that the median freezing temperature of the 1 mg/ml P. syringae suspension prepared in 100% $D_2O$ was as high as −4.6° C. Interface-specific sum frequency generation (SFG) spectroscopy and molecular dynamics simulation revealed that the hydrogen bonds formed at the water-bacterium interface imposed structural ordering on the adjacent water network facilitating ice nucleation. The disclosure further investigated the effects of commonly used cryoprotectants such as ethylene glycol, propylene glycol and trehalose on the freezing characteristics of $D_2O$ and $H_2O$ mixtures. The results show that the median freezing temperature of the suspension containing 1 mg/ml of a lyophilized preparation of P. syringae in 100% $D_2O$ is as high as −4.6° C., compared to −37.4° C. of pure $H_2O$. As the $D_2O$ concentration increases by every 25% (v/v), the profile of the ice nucleation kinetics of $D_2O$+$H_2O$ mixtures containing 1 mg/ml SNOMAX shifts by about one degree, suggesting an ideal mixing behavior of $D_2O$ and $H_2O$. Furthermore, several cryoprotectants are found to depress the freezing phenomenon. Both the homogeneous and heterogeneous freezing temperatures of these aqueous solutions depend on the water activity and are independent of the nature of solute. These findings can enrich the fundamental knowledge about $D_2O$-related ice nucleation and suggest that the combination of $D_2O$ and ice nucleating agents can be a potential self-ice nucleating formulation. The implications of self-nucleation include a higher, precisely controlled "ice-seeding" temperature for slow-freezing that will significantly improve viability of biological samples that are subject to various cryopreservation protocols.

Results in this disclosure also show the effect of higher nucleation temperatures on the survival of primary rat hepatocytes undergoing an equilibrium freezing and thawing protocol. The data show that changing only the ice nucleation temperature can result in 100% survival versus complete death of hepatocytes. Since ice nucleation is so critical to success, it is desirable to develop biocompatible ice nucleating agents, compositions, and/or formulations with the following features: (1) can be easily perfused, (2) will not cross the cell membrane thereby minimizing the probability of intracellular ice formation, (3) can be tuned to a certain size to calibrate ice formation in larger versus smaller microcapillaries, and (4) can be easily and completely removed prior to transplantation.

Ice Nucleation Temperature

When the temperature is lowered to a liquid's standard freezing point, the liquid will crystalize in the presence of a seed crystal or nucleus around which a crystal structure can form creating a solid. Lacking any such nuclei, the liquid phase can be maintained all the way down to the temperature at which crystal homogeneous nucleation occurs. Water normally freezes at 273.15 K (0° C.), but it can be "supercooled" at standard pressure down to its crystal homogeneous nucleation at about 224.8 K (−48.3° C.). The process of supercooling usually requires that water be pure and free of nucleation sites, which can be achieved by processes like reverse osmosis or chemical demineralization. When a nucleation site exists or the water is not substantially pure, the water will usually freeze at a temperature higher than −48.3° C. When the ice nucleation occurs, the crystallization around the ice nucleation site will quickly propagate, and the water will freeze. Thus, as used herein, the term "ice nucleation temperature" refers to the temperature at which the first stable ice embryo of critical size forms.

It is generally believed that uncontrolled ice nucleation destroys intracellular structures. When ice nucleation occurs as near as possible to the equilibrium freezing point (i.e. the highest temperature which promotes ice crystallization and propagation, also known as the melting point), cryodamage or cryoinjury can be minimized. This is supported from various evidences. For example, studies in diverse freeze-tolerant species have shown that ice nucleating agents (INAs) play a critical role in freezing survival. INAs in the blood and in the gut/skin induce controlled freezing of extracellular water at multiple nucleation sites. As the hemolymph gradually freezes, it is accompanied by an increase in the osmolality of the extracellular fluid, resulting in cellular dehydration as water is pulled from the intracellular environment. This provides further protection since the cellular fluids are no longer supercooled and ice nucleation in the intracellular environment is prevented.

Minimization of injury during cryopreservation may be achieved when ice nucleation occurs as near as possible to the equilibrium freezing point and when ice propagation is more uniform across larger sample volumes. Many studies have shown the benefits of controlled nucleation in the cryopreservation of cells for therapeutics. For example, embryonic stem cells have been shown to benefit from a slow, controlled-rate of cooling with ice nucleation induction at higher temperatures, resulting in improved survival rates from less than 22% to more than 90% [28]. One common way to achieve higher nucleation temperatures is creating a "cold point" by placing a cold metal surface in direct contact with the sample. However, this approach is only suited for small volumes since cooling is not uniform in relatively large samples (>1 mL). Moreover, this method causes problems with high variability of nucleation rates and is impractical for laboratories preserving large numbers of samples. The present disclosure provides various compositions and formulations (e.g., hydrogel particles, hydrogel particle composition and heavy water composition) to increase ice nucleation temperature.

Ice Nucleating Agent (INA)

As used herein, the term "ice nucleating agent" or "ice nucleator" refers to particles or surfaces that can promote ice formation, and initiate ice nucleation at a higher temperature when they are added into aqueous systems. As the purpose of the ice nucleating agents is to promote ice formation, the ice-nucleating agent does not include random or environmental contaminants, e.g., dust or soot. When an ice nucleating agent is added to water, the ice nucleation temperature will increase as a result. While the precise manner in which an ice nucleating agent accomplishes nucleation is not well understood, it is generally believed that ice nucleating agents organize water molecules in an ice like fashion, creating water molecule aggregates that are sufficiently large to nucleate at relatively higher temperatures. The ice nucleating agent can effectively promote ice formation. In some embodiments, the ice nucleating agent in a sufficient amount can increase the ice nucleation temperature by at least 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., or 38° C. In some embodiments, the ice nucleating agent in a sufficient amount can increase the ice nucleation temperature to over −10° C., −9° C., −8° C., −7° C., −6° C., −5° C., −4° C., −3° C., −2° C., or −1° C. In some embodiments, the sufficient amount refers to 0.001 mg, 0.005 mg, 0.01 mg, 0.05 mg, 0.1 mg, 0.5 mg, 1 mg, 5 mg, or 10 mg that are tested in 0.5 ml, 1 ml, or 1.5 ml pure water. Thus, in some embodiments, 0.01 or 0.1 mg of the ice nucleating agent as described herein can increase ice nucleation temperature of 0.5 ml pure water to over −6° C. or −5° C. (see e.g., FIG. 4).

The ice nucleating agent may be organic or inorganic. For example, the ice nucleating agents can be inorganic materials, such as fine particulates (microparticles, nanoparticles, mineral particles, or the like), or silver iodide, silver oxide, or alumina crystals. The ice nucleating agent can also be organic compounds, such as carbohydrates, phospholipids, proteins, alcohols, amino acids (e.g., aspartic acid), or lipoproteins. In some embodiments, the ice nucleating agent is long chain aliphatic alcohols. The ice nucleating agent can also be microorganism, e.g., virus, bacteria (e.g., ice nucleating bacteria), or fungi. Some commonly used ice nucleating agents include silver iodide, IceStart™ (Asymptote, Cambridge, UK) and SNOMAX® (SNOMAX LLC, Englewood, Colo.).

IceStart™ is a biocompatible material that acts as an ice nucleating agent during the cooling of aqueous solutions. It is an ice-nucleating agent composed of biologically inert mineral particles.

SNOMAX® is a "snow inducer" based on proteins from the bacterium *Pseudomonas syringae*. These proteins act as extra nuclides to improve the crystallization process. *Pseudomonas syringae*® proteins are extracted from the microorganisms to produce SNOMAX. After fermentation, the proteins are separated from the fluid and processed using special filters to form a slurry. This slurry is then frozen and freeze-dried. Any remaining living bacteria are killed in the process. Thus, SNOMAX® is the freeze-dried form of the ice-nucleating protein extracted from *Pseudomonas syringae*.

*Pseudomonas syringae* is a rod-shaped, Gram-negative bacterium. It produces an ice nucleation active (INA) protein, which causes water to freeze at fairly high temperatures (−4 to −2° C.). The ice nucleation active protein refers to a family of proteins that enable Gram-negative bacteria to promote nucleation of ice at relatively high temperatures. These proteins are usually localized at the outer membrane surface. The ice nucleation active protein in *Pseudomonas syringae* is known as ice nucleation active protein InaZ (UniProt P06620-1; SEQ ID NO: 1). The primary structure of the proteins contains a highly repetitive domain that dominates the sequence (SEQ ID NO: 2).

AGYGSTxTagxxssli AGYGSTxTagxxsxlt AGYGSTxTaqxxsxlt (SEQ ID NO: 2)

wherein x in SEQ ID NO: 2 represents any amino acid. The domain comprises a number of 48-residue repeats, which themselves contain 3 blocks of 16 residues, the first 8 of which are identical. It is thought that the repetitive domain may be responsible for aligning water molecules in the seed crystal. (See Wolber P K, Green R L (1990). "Detection of bacteria by transduction of ice nucleation genes". Trends Biotechnol. 8 (10): 276-279; Gurian-Sherman D, Lindow S E (1993). "Bacterial ice nucleation: significance and molecular basis". FASEB J. 7 (14): 1338-1343). *Pseudomonas syringae* and strains of *Pseudomonas syringae* are described in U.S. Pat. No. 5,489,521, which is incorporated herein by reference in its entirety.

Other microorganisms, or proteins from these microorganisms, can also be used as ice nucleating agents, e.g., *Pseudomonas fluorescens, Pseudomonas coronafaciens, Pseudomonas pisi, Erwinia species, Erwinia ananas, Erwinia herbicola, Escherichia coli, Xanthomonas*, ice-nucleating fungi and/or ice-nucleating protozoa. These ice nucleating agents are described, e.g., in WO/2011/026020, which is incorporated herein by reference in its entirety.

Hydrogel Particles

As used herein, the term "hydrogel particle" refers to a particle made of hydrogel. Hydrogels are highly hydrophilic natural or synthetic polymeric networks. The present disclosure provides hydrogel particles that contain an ice nucleating agent. The ice nucleating agent is enclosed, encapsulated, or embedded within the hydrogel particles. The hydrogel particles can have various shapes, e.g., spheres, beads, and can have similar shapes and sizes. The hydrogel particles have several advantages. First, as the ice nucleating agents (e.g., freeze-dried *P. syringae*) are encapsulated into hydrogel beads, the interaction between the INA and the biological system is minimized. Thus, the hydrogel particles are less likely to have toxic effects. Second, the particles can also be easily removed from the biological system.

The hydrogel particles as described in the present disclosure can be made by any methods known in the art. For example, in some embodiments, the ice nucleating agent (e.g., SNOMAX) can be mixed with water and hydrogel solution (e.g., alginate solution). The concentration of the ice nucleating agent in the mixture is the local concentration of the ice nucleating agent (This is also the concentration of the ice nucleating agent within the hydrogel particles). The mixture is then loaded into a syringe, and is then dropped into a hardening bath (e.g., a 1% (w/v) $CaCl_2$ hardening bath). The drops are then gelled in the hardening bath and further washed by purified water (e.g., Water for Injection (WFI)). The hydrogel particles can also be produced by flow focusing microfluidics device. For example, a solution containing the ice nucleating agent and the hydrogel solution (e.g., ~3% agarose) can pass through the flow focusing microfluidics device to give rise to hydrogel droplets or hydrogel bubbles (particles). Similarly, the concentration of the ice nucleating agent in the solution will be the concentration of ice nucleating agent within the hydrogel particles.

Thus, the concentration of ice nucleating agent within the hydrogel particles (local concentration $C_{local}$) can be easily adjusted. The concentration of ice nucleating agent can range from 0.01 mg/ml to 30 mg/ml, 0.1 mg/ml to 20 mg/ml, 0.5 mg/ml to 15 mg/ml, or 1 mg/ml to 5 mg/ml. In some embodiments, the concentration of ice nucleating agent is greater than 0.01 mg/ml, 0.1 mg/ml, 0.5 mg/ml, 1 mg/ml, 2 mg/ml, 3 mg/ml, 4 mg/ml, 5 mg/ml, or 10 mg/ml. In some embodiments, the concentration of ice nucleating agent is less than 30 mg/ml, 20 mg/ml, 10 mg/ml, 5 mg/ml, 4 mg/ml, 3 mg/ml, 2 mg/ml, 1 mg/ml, or 0.5 mg/ml.

The hydrogel particles can also have various sizes. For example, the hydrogel particles can be microliter-sized particles or nanoparticles. As used herein, the term "nanoparticle" refers to a particle between 1 and 100 nanometers in size. In some embodiments, the hydrogel particles can have a diameter less than 10 mm, less than 9 mm, less than 8 mm, less than 7 mm, less than 6 mm, less than 5 mm, less than 4 mm, less than 3 mm, less than 2 mm, less than 1 mm, or less than 0.5 mm. In some embodiments, the hydrogel particles can have a diameter greater than 10 mm, greater than 9 mm, greater than 8 mm, greater than 7 mm, greater than 6 mm, greater than 5 mm, greater than 4 mm, greater than 3 mm, greater than 2 mm, greater than 1 mm, or greater than 0.5 mm. As used herein, the term "diameter" refers to the longest chord of the circle on a sphere; when the particle is not a sphere, the diameter refers to the maximum length of a straight line connecting one point of the particle to another point of the particle.

The hydrogel particles can also have various volumes. In some embodiments, the hydrogel particle can have a volume less than 100 less than 50 less than 30 less than 20 less than 15 less than 10 less than 5 less than 4 less than 3 less than 2 or less than 1 µl. The hydrogel particle can also have a volume greater than 50 greater than 30 greater than 20 greater than 15 greater than 10 greater than 5 greater than 4 greater than 3 greater than 2 or greater than 1 µl.

The hydrogel in the hydrogel particles can be generated by a gel-former derived from a natural or synthetic polymer compound. The gel-former derived from a natural polymer compound includes, for example, agar, agarose, alginic acid (alginate), gelatin, gum arabic, quince seed mucous substance, tragacanth gum, guar gum, karaya gum, locust bean gum, glucomannan, pectin, galactan, pullulan, xanthan gum, casein, casein potassium salt, casein sodium salt, sodium chondroitin sulfate, starch-based semisynthetic polymer compounds (for example, carboxymethyl starch, methylhydroxypropyl starch, methylhydroxymethyl starch etc.) and dextrin. These gel-formers can be used alone or as a mixture of two or more thereof. In some embodiments, the hydrogel particle is an agarose hydrogel particle or an alginate hydrogel particle. Some of these gel-formers are described in U.S. Pat. No. 8,222,193, which is incorporated by reference herein in its entirety. The concentration of the gel-former in the hydrogel parties usually ranges from 0.5%~10% (w/w weight percentage), e.g., 1%, 2%, 3%, 4%, 5%, 6%, 7%, 8%, 9%, or 10%.

The hydrogel particles can contain water. In some embodiments, the hydrogel particles can contain heavy water (e.g., $D_2O$ or $T_2O$). Some other compounds can also be enclosed in the hydrogel particles. For example, in some embodiments, the hydrogel particles can contain a cryoprotectant as described herein (e.g., DMSO, EG, PROH, 3-OMG, or glycerol).

As shown in the present disclosure, the hydrogel particles described herein can increase ice nucleation temperature. In some embodiments, the hydrogel particles described herein can increase the ice nucleation temperature to over $-10°$ C., $-9°$ C., $-8°$ C., $-7°$ C., $-6°$ C., $-5°$ C., $-4°$ C., $-3°$ C., $-2°$ C., or $-1°$ C.

Furthermore, the ice nucleation temperature of similar samples can be different. In some cases, even the same sample can have different ice nucleation temperature due to the stochastic nature of ice nucleation. Thus, there is a range for the ice nucleation temperature (see e.g., FIG. 2A), e.g., $-8°$ C.~$-4°$ C. As used herein, the term "range" refers to the difference between the maximum ice nucleation temperature and the minimum ice nucleation temperature. For example, the range of $-8°$ C.~$-4°$ C. is $4°$ C. The hydrogel particles described herein can reduce the range of ice nucleation temperature of a plurality of samples. For example, the range of ice nucleation temperature can be reduced to $5°$ C., $4°$ C., $3°$ C., $2°$ C., or $1°$ C. Thus, hydrogel particles described herein can initiate ice formation in a more predictable manner.

The ice nucleating agent in the hydrogel particle can have a leakage rate less than 10%, 5%, 4%, 3%, 2%, 1%, 0.5%, or 0.1%. The leakage rate is defined as the amount of ice nucleating agents that are observed outside the hydrogel matrix (e.g., hydrogel particle) divided by the total amount of ice nucleating agents that are initially encapsulated in the hydrogel matrix. The amount of ice nucleating agents can be determined by various means known in the art. For example, the ice nucleating agents can be fluorescently labeled, and the amount can be determined by fluorescence intensity.

Hydrogel Particle Compositions

The present disclosure also provides compositions comprising hydrogel particles. In some embodiments, the composition also includes water (e.g., $H_2O$, $D_2O$ or $T_2O$).

The composition can also include one, two, or more than two cryoprotectants as described herein, e.g., within the hydrogel particles as described above, or separately in the composition.

As shown in the present disclosure, the ice nucleation performance of the hydrogel particles (e.g., SNOMAX-laden hydrogel beads) has been characterized by adjusting various factors, such as the size, number of the hydrogel particles, the local ice nucleation agent concentration $C_{local}$ (i.e., the concentration of the ice nucleation agent within the hydrogel matrix), and the addition of glycerol. It has been determined the total mass of local ice nucleation agent is a parameter that determines the ice nucleation temperature of the aqueous sample of a fixed volume (e.g., 0.1 ml, 0.5 ml, 1 ml, 5 ml, 10 ml, or 100 ml). Thus, the present disclosure provides compositions comprising ice nucleating agent of various mass. The total mass of the ice nucleating agent (e.g., SNOMAX) in the composition can be determined by the formula $$m = N \cdot V \cdot c_{local},$$

wherein m is the total mass of the ice nucleating agent, N is the number of the hydrogel particles in the composition, V is the volume or average volume of the hydrogel particles, and $c_{local}$ is the local concentration of the hydrogel particle. Thus, in some embodiments, the total mass of the ice nucleating agent (e.g., SNOMAX) in the composition is over 0.001, 0.01, 0.1, 1, 10, 100, 1000, $10^4$, $10^5$, or $10^6$ mg. In some embodiments, the total mass of the ice nucleating agent (e.g., SNOMAX) in the composition is less than 0.001, 0.01, 0.1, 1, 10, 100, 1000, $10^4$, $10^5$, or $10^6$ mg.

In some embodiments, the composition can also include cryoprotectants, and/or a preservative, e.g., an antibiotic.

Heavy Water Compositions

Heavy water is a form of water in which the common hydrogen-1 ($^1H$) isotope is substituted with a larger than normal amount of the deuterium isotope (D or $^2H$) or tritium isotope (T or $^3H$). Thus, as used herein, heavy water refers to $D_2O$ or $T_2O$. The toxicity of heavy water varies from simple to complex organisms: algae and bacteria can adapt to grow in 100% $D_2O$ and actually serve as a source for deuterated molecules, while concentrations of more than 20% can be toxic to animals and animal cells at normal body temperatures. At the cellular level, $D_2O$ has been shown to slow down the cell cycle and lengthen circadian rhythms, and increases the heat stability of macromolecules but may decrease the cellular response to heat stress (possibly as a result of inhibition of chaperon function). Furthermore, $D_2O$ has been shown to improve the stability of vaccinations as a result of its protective effects on biomolecules (e.g. proteins and nucleic acids) and has applications in pharmaceuticals since it affects drug metabolism.

Amongst the many broad applications of heavy water described above, $D_2O$ is a more potent ice nucleator than $H_2O$. Thus, in one aspect, the present disclosure provides a composition comprising heavy water ($D_2O$ or $T_2O$) and an ice nucleating agent. In some embodiments, the heavy water is $D_2O$.

The heavy water content in the composition can vary. In some embodiments, the weight percentage of heavy water in the composition can be over 5%, 10%, 20%, 25%, 30%, 40%, 50%, 60%, 70%, 80%, 90%, or 95%. In some embodiments, the weight percentage of heavy water in the composition can be less than 10%, 20%, 25%, 30%, 40%, 50%, 60%, 70%, 80%, 90%, or 95%.

The composition can also contain $H_2O$. In some embodiments, the volume percentage of heavy water ($D_2O$ or $T_2O$) of all water in the composition (v/v) can be over 5%, 10%, 20%, 25%, 30%, 40%, 50%, 60%, 70%, 80%, 90%, or 95%. In some embodiments, the volume percentage can be less than 10%, 20%, 25%, 30%, 40%, 50%, 60%, 70%, 80%, 90%, or 95%. In some embodiments, the volume percentage is 100%, which means all water in the composition is heavy water (e.g., $D_2O$ or $T_2O$).

The composition can include one, two, or more than two ice nucleating agents (e.g., SNOMAX or silver iodide). The concentration of the ice nucleating agent will affect the ice nucleation temperature. In some embodiments, the concentration can be greater than 0.001 g/L, 0.01 g/L, 0.05 g/L, 0.1 g/L, 0.2 g/L, 0.3 g/L, 0.4 g/L, 0.5 g/L, 0.6 g/L, 0.7 g/L, 0.8 g/L, 0.9 g/L, 1 g/L, 5 g/L, or 10 g/L. In some embodiments, the concentration can be less than 0.001 g/L, 0.01 g/L, 0.05 g/L, 0.1 g/L, 0.2 g/L, 0.3 g/L, 0.4 g/L, 0.5 g/L, 0.6 g/L, 0.7 g/L, 0.8 g/L, 0.9 g/L, 1 g/L, 5 g/L, or 10 g/L. In some embodiments, the concentration can have a range, e.g., 0.1 g/L~0.5 g/L.

As shown in the present disclosure, the heavy water composition can increase ice nucleation temperature. In some embodiments, the heavy water composition can increase the ice nucleation temperature to over $-10°$ C., $-9°$ C., $-8°$ C., $-7°$ C., $-6°$ C., $-5°$ C., $-4°$ C., $-3°$ C., $-2°$ C., or $-1°$ C. The heavy water composition described herein can also reduce the range of ice nucleation temperature. For example, the range of ice nucleation temperature can be reduced to $5°$ C., $4°$ C., $3°$ C., $2°$ C., or $1°$ C.

In some embodiments, the composition can also include hydrogel particles, cryoprotectants, and/or a preservative.

Cryoprotectants

The composition as described herein (e.g., various hydrogel particle compositions and various heavy water compositions) can also include one, two, or more than two cryoprotectants. As used herein, the term "cryoprotectant" refers to a substance that prevents or reduce damage to cells during freezing. Various cryoprotectants can be included in the compositions described in the present disclosure. These cryoprotectants include, e.g., sugar, polypropylene glycol, dimethylsulfoxide (DMSO), dextran, glycerol, sorbitol, propylene glycol, ethylene glycol, pyridine, 2-3 butane diol, hydroxyethyl starch, polyvinylpyrrolidone (PVP), proline (or other protein stabilizers), human serum albumin and combinations thereof. The sugar can also be any one of the following, e.g., sucrose, trehalose, raffinose, stachyose, fructose, and dextran. Exemplary sugars and the concentration ranges for such sugars are described in U.S. Pat. Nos. 6,673,607 and 7,094,601, herein incorporated by reference.

The cryoprotectant can be either membrane-permeable or non-permeable. The permeable cryoprotectants include, e.g., DMSO, alcohol such as ethylene glycol (EG), PROH (propylene glycol, propane-1,2-diol, or 1,2-propanediol), glycerol, and saccharide derivatives such as 3-O-methyl-glucose (3-OMG). The non-permeable cryoprotectants include, e.g., saccharides such as fructose, trehalose, sucrose, sorbitol, or raffinose, polymers such as hydroxyethyl starch (HES) or polyvinylpyrrolidone (PVP), amino acids such as L-proline, and biological macromolecules such as human serum albumin, and any combinations thereof. In some embodiments, the cryoprotectant is sucrose, trehalose, stachyose, raffinose, or polymers (e.g. PEG, PVA, HES). In some embodiments, the composition includes University of Wisconsin (UW) solution, 3-OMG, Trehalose, N-acetyl-L-cysteine, and/or hydrogen sulfide.

The cryoprotectant can have various concentrations (w/v), e.g., 1%, 2%, 3%, 4%, 5%, 10%, 15%, 20%, 25%, 30%, 35%, 40%, or 50%. As used herein, the "weight/volume (w/v) concentration" or "weight/volume (w/v) percentage" refers to the weight (in grams) of solute dissolved in a final volume of 100 mL of solution. For example, the concentration 1% (w/v) refers to a solution with 1 g of solute dissolved in a final volume of 100 mL of solution. In some embodiments, the concentration (w/v) can be greater than 1%, 2%, 3%, 4%, 5%, 10%, 15%, 20%, 25%, 30%, 35%, 40%, or 50%. In some embodiments, the concentration (w/v) can be less than 1%, 2%, 3%, 4%, 5%, 10%, 15%, 20%, 25%, 30%, 35%, 40%, or 50%. For example, the concentrations (w/v) for the cryoprotectants (e.g., DMSO, EG, PROH, glycerol, propylene glycol, pyridine, 2-3 butane diol, or human serum albumin) can be 1%, 2%, 3%, 4%, 5%, 10%, 15%, 20%, 25%, 30%, 35%, or 40%. In some embodiments, the concentration (w/v) for the cryoprotectants is less than 40%.

The concentration of a solute can also be expressed as a weight percentage (w/w). The concentration 1% (w/w) refers to a solution with 1 g of solute dissolved in a 100 g of the final solution (including both the solute and the solvent). In some embodiments, the concentration (w/w) of a cryoprotectant can be greater than 1%, 2%, 3%, 4%, 5%, 10%, 15%, 20%, 25%, 30%, 35%, 40%, or 50%. In some embodiments, the concentration (w/w) can be less than 1%, 2%, 3%, 4%, 5%, 10%, 15%, 20%, 25%, 30%, 35%, 40%, or 50%. For example, the concentration (w/w) for the cryoprotectants (e.g., PVP) can be less than 5%, e.g., 1%, 2%, 3%, 4%, or 5%.

The amount of a solute in a solution can also be expressed in molar concentration. A commonly used unit for molar concentration is the molar (M) which is defined as the number of moles per liter. In some embodiments, the concentration of a cryoprotectant can be higher than 50 mM, 100 mM, 200 mM, 300 mM, 400 mM, 500 mM, 600 mM, 700 mM, 800 mM, 900 mM, 1 M, 2M, 3M, or 4M. In some embodiments, the concentration of a cryoprotectant can be less than 50 mM, 100 mM, 200 mM, 300 mM, 400 mM, 500 mM, 600 mM, 700 mM, 800 mM, 900 mM, 1 M, 2M, 3M, or 4M. For example, the concentration of a cryoprotectant (e.g., sucrose, sorbitol, fructose, trehalose, raffinose, hydroxyethyl starch, 3-OMG) can be equal to or less than 1M, e.g., 100 mM, 200 mM, 300 mM, 400 mM, 500 mM, 600 mM, 700 mM, 800 mM, 900 mM, or 1 M. The concentration of a cryoprotectant (e.g., proline) can be equal to or less than 300 mM, e.g., 100 mM, 200 mM, or 300 mM.

Cryoprotectants can be added to the composition as described herein (e.g., hydrogel particle compositions and heavy water compositions) as a single agent or as a combination of one or more agents. For example, 2M ethylene glycol or 1,2-propanediol (PROH) can be supplemented with 0.5 to 2M sugar to produce a synergistic effect. For example, a combination of ethylene glycol and a sugar or a combination of PROH and a sugar can be used. In one example, 2M PROH and 0.5 M trehalose are added to the composition. In another example, 0.3M sucrose and 1.5M PROH is used. The combination of a permeating and non-permeating cryoprotectant allows for a lower intracellular concentration of cryoprotectant, since the non-permeating cryoprotectant does not enter the cell. For example, in the 2M PROH and 0.5 M trehalose example described above, the intracellular concentration of cryoprotectant would be 2M since trehalose is not permeable to the plasma membrane of mammalian cells.

Nanoparticles and Microparticles

The compositions as described herein can further include nanoparticles or microparticles or both. The addition of nanoparticles or microparticles is thought to enhance the thermal conductivity of the composition.

Examples of such nanoparticles or microparticles include particles having carbon or a noble metal, such as gold, silver, titanium, palladium, platinum, or similar particles thereto. Examples of such nanoparticles and/or microparticles may include, but are not limited to, carbon or noble metals, e.g., gold, silver, titanium, palladium, platinum, and copper. In one aspect of the disclosure, the nanoparticles are present in the composition as described herein in an amount up to 99%, 50%, 25%, 20%, 10%, 5% or lower, based on the total weight of the composition. In another aspect of the disclosure, the microparticles are present in the composition as descried herein in an amount up to 99%, 99%, 50%, 25%, 20%, 10%, 5%, based on the total weight of the composition. It has been shown that the presence of a small fraction (<1% vol) of nanoparticles in a composition can increase the thermal conductivity of the composition up to more than 200% (Choi et al., Applied Physics Letter 79: 2252-2254, 2001; Eastman et al., Applied Physics Letter 78: 718-720, 2001).

Preserving Biologic Samples, Organs, or Organisms

The disclosure provides methods of preserving a biological sample. The methods include the steps of contacting the biological sample with compositions or formulations as described herein (e.g., hydrogel particle compositions, heavy water compositions), and freezing the biological sample with the composition or formulations. The biological sample can be a cell, a tissue sample, oncosomes, exosomes, microvesicles or liposomes. The biological sample can also contain nucleic acids (e.g., DNA, RNA, mRNA, microRNA etc.), proteins, and/or lipids. Thus, in some embodiments, the compositions or formulations as described herein can improve the yield of nucleic acids after being frozen and thawed.

The disclosure also provides methods of preserving an organ. The methods include the steps of perfusing, contacting, or immersing the organ with compositions or formulations as described herein, and freezing the organ with the composition or formulations. The methods of perfusing an organ is known in the art. For example, perfusion can be performed by pouring over or through the arteries or veins of the organ. In some embodiments, a perfusion device can be used. The organ can also be immersed within the compositions or formulations. The organ can be any organ of a mammal, e.g., heart, lung, kidney, and liver etc. Furthermore, during static cold storage of organs, many harmful processes can contribute to short preservation times including ATP depletion, calcium overload, production of reactive oxygen species, cytoskeleton disruption, and cellular acidosis, all of which are magnified by ischemia-reperfusion injury following storage. $D_2O$ has been shown to inhibit cytosolic calcium, improve microtubule stability, stabilize membranes and proteins [39], thus, the compositions and formulations described herein can also minimize ischemia-reperfusion damage.

The disclosure also provides methods of preserving an organism. The methods include the steps of contacting, or immersing the organism with compositions or formulations as described herein, and freezing the organism with the composition or formulations. The organism can be viruses, bacteria, fungi, invertebrates (e.g., insects), fish, or reptiles.

The biological samples, organs, or organisms can be frozen at the ice nucleation temperature. In some embodiments, the ice nucleation temperature is over −10° C., −9° C., −8° C., −7° C., −6° C., −5° C., −4° C., −3° C., −2° C., or −1° C. The methods can further include the step of thawing the biological samples, organs, or organisms. In addition, the methods as described herein can further be used to improve the outcome and standardization of many ice-assisted process technologies such as the slow-freezing cryopreservation of stem cells for regenerative medicine, cellular therapies, and drug screening.

The biological samples can include mammalian cells. The methods described herein can be used for the cryopreservation of any type and any species of mammalian cells. For example, the methods can be used to cryopreserve oocytes or sperm in assisted reproductive technology or for patients undergoing chemotherapy or radiation therapy. The methods can also be used for the cryopreservation of stem cells, such as embryonic stem cells, or other cells, which can then be used as the basis of stem cell-based therapies, cell transplantation, tissue engineering, and regenerative medicine. The methods can also be used to cryopreserve oocytes or sperm from an animal that is rare or at risk of becoming extinct for future use in assisted reproductive technologies for the preservation of the species. The methods can further be used for animal husbandry purposes (e.g., the breeding and raising of animals), for example, for the cryopreservation of embryonic stem cells, gametocytes, oocytes, or sperm from animals such as cows, pigs, and sheep.

Cell types that may be cryopreserved using the compositions and methods of the present disclosure include, for example, differentiated cells, such as epithelial cells, cardiomyocytes, neural cells, epidermal cells, keratinocytes, hematopoietic cells, melanocytes, chondrocytes, B-cells, T-cells, erythrocytes, macrophages, monocytes, fibroblasts, or muscle cells; and undifferentiated cells, such as embryonic, mesenchymal, or adult stem cells. Additional cell types that can be cryopreserved using the methods of the disclosure include gametocytes, oocytes, sperm, zygotes, and embryos. Other cells include those from the bladder, brain, esophagus, fallopian tube, heart, intestines, gallbladder, kidney, liver, lung, ovaries, pancreas, prostate, spinal cord, spleen, stomach, testes, thymus, thyroid, trachea, ureter, urethra, or uterus.

The cells may be from a human or non-human mammal, for example Cercopithecoidea family, Hominoidea superfamily, *Canis familiaris, Felis catus, Cricetidae* spp., *Equus* spp. (e.g., *Equus caballus, Equus assinns*), Equidae family, *Bos taurus, Bos indicus*, Bovidae family, Camelidae family, *Bubalus bubalis, Capra aegagrus hircus*, Cervidae family, Cervinae family, *Ovis aries, Ovis canadensis, Capra hircus, Sus scrofa domestica, Mesocricetus* spp., *Mustela vison, Cavia porcellus, Meriones unguiculatus, Chinchilla laniger, Rattus norvegicus, Rattus* spp., *Mus musculus*, Leporidae family, *Oryctolagus cuniculus, Kobus* spp., *Gallus* spp., *Meleagria gallopavo, Anatidae* spp., *Mustela putorius, Columba domestica, Columba livia, Numida meleagris, Ornithorhynchus anatinus, Pavo cristatus, Bison* spp., *Struthio* spp., *Lama glama, Rhea* spp., *Dromiceius* spp., *Lama pacos, Rangifer tarandus, Bos grunniens, Camelus bactrianus, Camelus dromedarius*, and any endangered or threatened species (e.g., those species identified by the U.S. Fish and Wildlife Service (USFWS) Threatened and Endangered Species System (TESS)).

The cells are prepared for cryopreservation using techniques known in the art and described herein. Generally, the mammalian cells are obtained using art known techniques and maintained in media appropriate for the cell type.

Viability of Cryopreserved Biological Samples

When desired, the cryopreserved biological samples of the disclosure can be warmed, using methods known in the art or described herein. For example, the biological sample can be plunged into a 1×PBS solution at 20-37° C., for example room temperature, optionally with shaking and optionally supplemented with sugar or other cryoprotectants. After warming, the biological samples (e.g., cells) are generally washed, suspended in the appropriate media and treated as needed for use in research or clinical applications. For example, embryonic stem (ES) cells can be plated and passaged using techniques known in the art. Oocytes are generally cultured in droplets of media immersed in oil. It will be clear to the skilled artisan the exact conditions and media that are used for culturing the cells before and after cryopreservation.

There are various tests known in the art to determine the viability and function of the biological samples (e.g., cells) after warming and these tests are dependent on the types of biological samples. For example, for ES cells that are to be used for cell-based therapeutics, maintenance of pluripotency is very important. The pluripotency of the ES cells can be tested using art known methods, including, for example, Oct4-GFP expression, elevated alkaline phosphatase expression, and SSEA-I surface glycoprotein expression. The ability of cells to attach efficiently is another assay for the viability and usability of many cells. Attachment assays are known in the art and described herein. Proliferation assays can also be used to determine if the attached cells can proliferate as expected after cryopreservation. Attachment and proliferation efficiency can be compared to control cells, which have not undergone cryopreservation. For cryopreservation of zygotes, cleavage rates can be determined after cryopreservation and compared to control groups to determine if there has been any cellular damage during the cryopreservation process. The viability of oocytes can be determined by examination of the morphological characteristics of the cells following cryopreservation. Morphologically viable oocytes exhibit intact zona pellucida and plasma membrane and refractive cytoplasm, while non-viable oocytes appear degenerated when visualized under a light microscope. The ultimate criterion for oocyte viability and function is their capability to be fertilized by healthy sperm in vitro and in vivo, followed by cleavage, blastocyst, and/or hatching or development of the fetus.

The assays for testing the viability, function, and usability of biological samples can also be used to test parameters for the cryopreservation methods described herein. For example, variations in the compositions (e.g., different cryoprotectants or cryoprotectant concentrations) can readily be tested on cells, and their effects on the viability, function, and usability of biological samples can be tested using any of the methods described herein or known in the art.

Freezing Systems

The present disclosure also provides freezing systems. The freezing system can include a container for biologic samples, organs, or organisms. The container can be e.g., a bag, a plastic vial, a glass vial, a plastic straw, a pulled straw, a capillary tube or straw, and/or a bioreactor. The freezing system can also include a cooling system. The freezing systems can further include the compositions or formulations as described herein. In some embodiments, the ice nucleating agent or the hydrogel particle as described in the present disclosure can be immobilized on the surface of the freezing system.

Designing Compositions or Formulations for Specific Ice Nucleation Temperature

The ice nucleation performance of the hydrogel particles has been characterized in the present disclosure. In the aqueous sample of a fixed volume, the total mass of the INA in the particles has been identified as a universal parameter that dictates the ice nucleation temperature. These findings provide the guidance to tune the ice nucleation temperature within a 6-degree window or even larger by adjusting the size and number of hydrogel particles and the local INA concentration.

As shown in FIG. 4, the freezing temperature (ice nucleation temperature) is plotted as a function of the total mass of ice nucleating agents ($m = N \cdot V \cdot c_{local}$, in a log 10 scale) existing in 0.5 ml water. The freezing temperatures of suspensions of ice nucleating agents are also measured. All the data points shown in FIG. 4 share the same trend. The Pearson's correlation suggests a clear positive linear relationship between $T_f$ and $\log_{10} m$. The curve that best fits all the data points is $$T_f = 0.6478 \cdot \log_{10} m - 3.052 (R^2 = 0.9019).$$

This demonstrates that the total mass of ice nucleation temperature is the parameter to dictate the occurrence of ice nucleation in 0.5 ml water regardless of the form of presence of the INA particles, either in a suspension or in a confined space.

Figure 5:
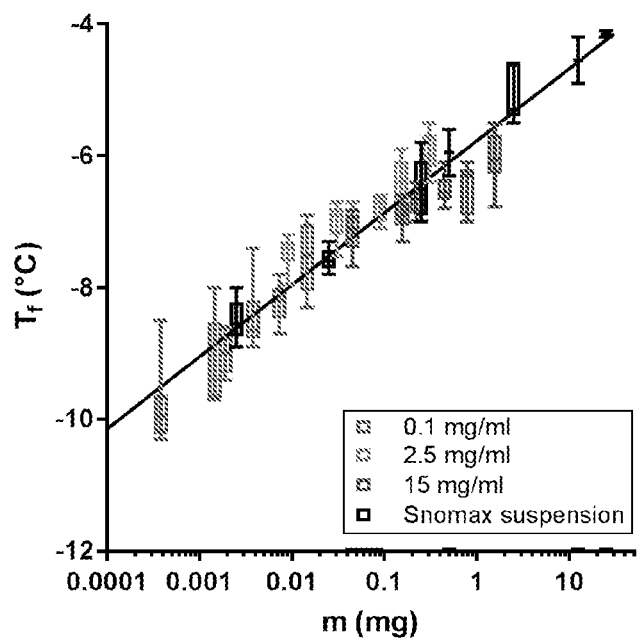
FIG. 5. The freezing temperature ($T_f$) profile that is plotted as a function of the total mass of SNOMAX (m) existing in 0.5 ml aqueous 10% glycerol. The dark black data points represent the freezing temperatures of the SNOMAX suspensions of 0.005-50 mg/ml prepared in 10% glycerol. The solid line $T_f=1.093 \cdot \log_{10}(m) - 5.771$ is the best fit to all the data points ($R^2=0.9571$).
Figure 6:
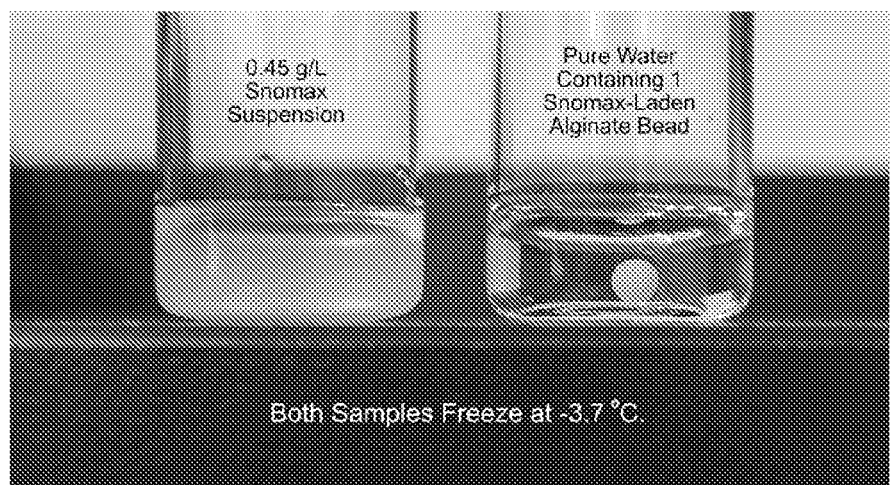
FIG. 6 is an image showing a side by side illustration of two samples with SNOMAX in suspension or in an alginate bead.

In FIG. 5, the freezing temperatures of aqueous 10% glycerol solution is plotted as a function of m in log 10 scale. The curve that best fits all the data points is $$T_f = 1.093 \cdot \log_{10}(m) - 5.771 (R^2 = 0.9571)$$

The data show that the addition of solute does not change the role of the total mass of INA particles as the governing parameter. Therefore, one can increase the total mass of INA particles by adjusting the combination of N, V and $c_{local}$ to increase the ice nucleation temperature.

Furthermore, the concentration of $D_2O$ has a predictable impact on the ice nucleation temperature. For example, if the $D_2O$ concentration increases by every 25% (v/v), the profile of the ice nucleation kinetics of $D_2O+H_2O$ mixtures containing 1 mg/ml SNOMAX shifts by about one degree.

Therefore, the present disclosure provides methods of designing compositions and formulations that have a desired ice nucleation temperature. In one aspect, the methods involve selecting a desired ice nucleation temperature, determining the optimal values for N, V and $c_{local}$ based on a predetermined curve that correlates ice nucleation temperature and total mass of the ice nucleating agents, producing a hydrogel particle composition with the determined values of N, V and $c_{local}$. The predetermined curve can be the curve as shown in FIG. 4 and FIG. 5. Furthermore, a person skilled in the art can easily determine a curve that correlates ice nucleation temperature and total mass of the ice nucleating agents by the methods described in the present disclosure.

In another aspect, the methods involve selecting a desired ice nucleation temperature, determining the optimal values for $D_2O$ concentration based on a predetermined curve that correlates ice nucleation temperature and the $D_2O$ concentration, producing a heavy water composition with the determined $D_2O$ concentration. A person skilled in the art can also easily determine a curve that correlates ice nucleation temperature and the $D_2O$ concentration by the methods described in the present disclosure.

EXAMPLES

The invention is further described in the following examples, which do not limit the scope of the invention described in the claims.

Example 1. SNOMAX-Laden Alginate Beads

The following materials and methods were also used in Examples 2-5.

A certain amount of alginic acid sodium salt (Sigma-Aldrich, St. Louis, Mo.) was dissolved in cell culture grade water (Gibco WFI for Cell Culture, Thermo Fisher Scientific, Waltham, Mass.) to prepare a stock solution of 4% (w/v) alginate. The SNOMAX (SNOMAX International, Englewood, Colo.) suspension (0.2-30 mg/ml) prepared in WFI water was mixed with an equal volume of the stock alginate solution, yielding a final local concentration of 0.1-15 mg/ml SNOMAX and 2% (w/v) alginate.

The SNOMAX-containing alginate solution was loaded into a 3 ml syringe (BD Biosciences, San Jose, Calif.) which was then mounted vertically onto a GenieTouch Syringe Pump (Kent Scientific Corporation, Torrington, Conn.). As illustrated in FIG. 1A, the SNOMAX-containing alginate solution was then dropped into a 1% (w/v) $CaCl_2$ hardening bath as the syringe pump applied a constant flow rate of 100 μl/min. The 30 gauge and 18 gauge flat needles (SAI Infusion Technologies, Libertyville, Ill.) were used, which have an inner diameter of 0.159 and 0.838 mm, respectively. The alginate beads were gelled in the $CaCl_2$ bath for 30 min with frequent agitation followed by triple washing with WFI water to remove excessive $CaCl_2$ and the SNOMAX particles on the bead surface. The prepared hydrogel beads were added into 0.5 ml WFI water contained in a 2 ml cryogenic vial (Corning Glass Works, Corning, N.Y.). For the samples made of 10% glycerol, the alginate beads were incubated in a stock solution of 10% glycerol at room temperature for 20 hours on a HulaMixer sample mixer (Life Technologies, Carlsbad, Calif.) before they were added into 0.5 ml fresh 10% glycerol solution contained in the cryovial. It was showed previously that the diffusion of glycerol had reached equilibrium across the 1-5% (w/v) alginate beads after 20 hours [5].

As illustrated in FIG. 1B, each aqueous sample contained 1, 5 or 10 beads of a given local SNOMAX concentration and a given size. The cryovial was placed into a Kryo 560-16 controlled rate freezer (Planer, Middlesex, UK) subjected to a cooling ramp at 1° C./min until freezing. The temperature of each sample was measured by a Type-K thermocouple (Digi-Sense, Cole Parmer Instrument Co., Chicago, Ill.) that was inserted into the sample through a drilled hole on the cryovial cap. The temperature was recorded every second by a data logger (RDXL6SD, Omega Engineering, Inc., Stamford, Conn.). It should be noted that in this study the junction of the thermocouple is enclosed in a smooth stainless steel sheath of 2.5 mm in diameter. The preliminary study found that when an exposed thermocouple junction was immersed into the liquid, air bubbles might adsorb to the junction and serve as an ice nucleation site, causing uncontrolled and spontaneous freezing [11]. Once ice nucleates in the aqueous sample, the temperature will return to the melting point and then follow the liquidus curve. As seen in FIG. 1C, the ice nucleation temperature or the freezing temperature ($T_f$) can be identified when an abrupt increase appears in the temperature profile. A total of 8-16 replicates were measured for each experimental condition.

Example 2. Morphology of SNOMAX-Laden Alginate Beads

A range of alginate beads were prepared in this example. FIG. 1D shows two examples that were prepared by the 18-gauge needle and had a local SNOMAX concentration of 0.1 mg/ml and 15 mg/ml, respectively. As expected, a higher $C_{local}$ of SNOMAX particles contributed to less transparency of the hydrogel beads. Table 1 summarizes the size of the alginate beads that had different local concentrations of SNOMAX and were generated by the 30-gauge or 18-gauge needle. With the same $C_{local}$, the beads generated by the 18-gauge needle were around 3.5 times as large as those generated by the 30 gauge needle in terms of volume. When the same needle size was used, a higher local concentration of SNOMAX led to a smaller bead volume. This is mainly because a smaller volume is needed for the gravity to overcome the surface tension at the tip of the needle if the local concentration of solid particles is higher. The size of the prepared bacterial hydrogel beads enables easy removal of used INA particles, which may benefit the downstream processing.

To illustrate the effect of freezing on the hydrogel structure, FIGS. 1E and 1F compared the morphologies of SNOMAX-free beads before and after they were freeze-thawed. It is clear that the freeze-thawed alginate bead (FIG. 1F) is still intact but has a wrinkled surface, which is very similar to those treated by the freeze-drying or air drying process [12, 14]. This wrinkling phenomenon has been suggested to result from the partial collapse of the polymer network due to the loss of water content during ice formation or evaporation [12, 14].

TABLE 1

The diameter (D) and volume (V) of the alginate beads containing different local concentrations ($C_{local}$) of SNOMAX generated by the 30 gauge or 18 gauge needle

| | D (mm) | | V (μl) | |
|---|---|---|---|---|
| $c_{local}$ (mg/ml) | 30-gauge | 18-gauge | 30-gauge | 18-gauge |
| 0 | 1.91 ± 0.03 | 2.92 ± 0.05 | 3.7 ± 0.2 | 13.1 ± 0.6 |
| 0.1 | 1.94 ± 0.05 | 3.03 ± 0.03 | 3.8 ± 0.3 | 14.6 ± 0.5 |
| 2.5 | 1.89 ± 0.04 | 2.86 ± 0.02 | 3.6 ± 0.2 | 12.2 ± 0.3 |
| 15 | 1.78 ± 0.02 | 2.71 ± 0.05 | 3.0 ± 0.1 | 10.5 ± 0.5 |

Example 3. Ice Nucleation in Water Facilitated by SNOMAX-Laden Alginate Beads

Figure 2B:
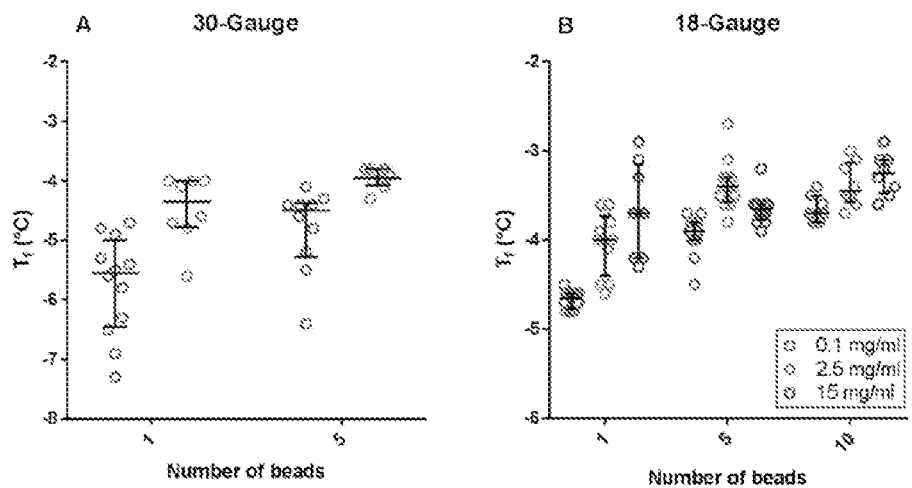
FIG. 2B. The freezing temperature ($T_f$) of WFI water in the presence of alginate beads containing different local concentrations of SNOMAX (0.1, 2.5, or 15 mg/ml). The beads were generated by an 18-gauge needle.

FIG. 2 shows the freezing temperature of WFI water in the presence of SNOMAX-laden alginate beads of different $C_{local}$ (i.e., 0.1, 2.5 or 15 mg/ml). Given the stochastic nature of ice nucleation, the data points of all replicates were presented and the median freezing temperature ($T_f^{median}$) and the interquartile range were indicated. In general, the freezing temperature is positively related to three parameters under investigation: the number of beads (N), the volume of beads (V), and the local SNOMAX concentration ($c_{local}$) It can be seen in FIG. 2A that the presence of a single bead prepared by the 30-gauge needle and containing 0.1 mg/ml SNOMAX induced the ice nucleation at −5.6° C. whereas the median freezing temperature increased to −4.5° C. with the addition of four more beads of the same size and $c_{local}$. As for the effect of V, five beads that were prepared by the 30-gauge needle and contained 2.5 mg/ml SNOMAX led to a median freezing temperature of −4.0° C. But when the beads were generated by the 18-gauge needle, therefore more than three times as large as their 30-gauge counterparts, the $T_f^{median}$ increased to −3.4° C. As seen in FIG. 2B, the presence of ten beads generated by the 18-gauge needle and containing 0.1 mg/ml SNOMAX led to a median freezing temperature of −3.7° C. When the local SNOMAX concentration increased to 15 mg/ml, the median freezing temperature became −3.3° C. Table 2 shows that the median freezing temperature of 0.5 ml WFI water alone is −8.0° C. while the $T_f^{median}$ of 0.5 ml WFI water containing ten SNOMAX-free alginate beads prepared by the 18-gauge needle is −7.2° C. Since almost all the data points shown in FIGS. 2A-2B are higher than −7° C., the SNOMAX particles played a major role in enhancing the ice nucleation temperature even though they were confined within a hydrogel matrix.

TABLE 2

The freezing temperature ($T_f$) of 0.5 ml WFI water in the absence of any beads or containing ten SNOMAX-free beads

| | $T_f$ | | |
|---|---|---|---|
| | WFI | WFI w/10 beads (30 gauge) | WFI w/10 beads (18 gauge) |
| Median | −8.0° C. | −8.1° C. | −7.2° C. |
| (Min, Max) | (−9.8° C., −7.2° C.) | (−8.8° C., −8.1° C.) | (−7.5° C., −7.0° C.) |

Example 4. Ice Nucleation in 10% Glycerol Facilitated by SNOMAX-Laden Alginate Beads The freezing phenomenon in aqueous 10% glycerol solution that was facilitated by the SNOMAX-laden alginate beads was also investigated. Glycerol is one of the most commonly used cryoprotectants due to its colligative property, strong hydrogen-bonding ability, and high viscosity at low temperatures [4]. As seen in FIGS. 3A-3B, the freezing temperature of 10% glycerol in the presence of alginate beads of different $C_{local}$ and different sizes presents the similar trends to those found in FIGS. 2A-2B. The addition of the solute glycerol did not change the positive relationship between the freezing temperature and N, V, or $c_{local}$. FIG. 3A shows that the presence of a single bead prepared by the 30-gauge needle and containing 0.1 mg/ml SNOMAX led to the ice nucleation at −10.0° C. while the median freezing temperature increased to −8.7° C. with the addition of nine more beads of the same V and $c_{local}$. It is also shown that the five beads that contained 2.5 mg/ml SNOMAX and were prepared by the 30-gauge needle contributed to a median freezing temperature of −7.0° C. When the beads were prepared by the 18-gauge needle, the $T_f^{median}$ increased to −6.4° C. FIG. 3B shows that the addition of ten beads each containing 0.1 mg/ml SNOMAX generated a median freezing temperature of −7.5° C. However, when the beads contained 15 mg/ml SNOMAX, the median freezing temperature increased to −6.1° C. As summarized in Table 3, the median freezing temperature of 0.5 ml 10% glycerol containing neither SNOMAX nor hydrogel beads is −11.8° C. The $T_f^{median}$ of 0.5 ml 10% glycerol having ten SNOMAX-free alginate beads prepared by the 18-gauge needle is −11.1° C. All the data points shown in FIGS. 3A-3B are above −11° C. Therefore, it is the SNOMAX particles that significantly enhanced the freezing temperature of the aqueous system.

TABLE 3

The freezing temperature ($T_f$) of 0.5 ml aqueous 10% glycerol in the absence of any beads or containing ten SNOMAX-free beads

| | $T_f$ | | |
|---|---|---|---|
| | 10% glycerol | 10% glycerol w/10 beads (30 gauge) | 10% glycerol w/10 beads (18 gauge) |
| Median | −11.8° C. | −11.5° C. | −11.1° C. |
| (Min, Max) | (−13.0° C., −10.4° C.) | (−12.0° C., −10.9° C.) | (−11.8° C., −10.6° C.) |

Example 5. Ice Nucleation Performance Parameter

There are multiple factors that can affect the ice nucleation of the aqueous samples containing SNOMAX-laden hydrogel beads. One may obtain the same freezing temperature by employing different combinations of N, V and $c_{local}$. Therefore, it will be highly instructive to provide a universal parameter that is solely responsible for determining the freezing temperature. In this example, the total mass of the SNOMAX particles contained by the aqueous sample of a fixed volume was determined be such a parameter.

In FIG. 4, the freezing temperature was plotted as a function of the total mass of SNOMAX ($m=N\cdot V\cdot C_{local}$, in a log 10 scale) existing in 0.5 ml WFI water. The freezing temperatures of suspensions of free SNOMAX particles ranging from 0.005 to 100 mg/ml prepared in WFI water (FIG. 4) were also measured. It is evident that all the data points shown in FIG. 4 share the same trend. The Pearson's correlation between $T_f$ and $\log_{10}$ m yields a coefficient (r) of 0.9497, suggesting a clear positive linear relationship between $T_f$ and $\log_{10}$ m. The curve that best fits all the data points is $$T_f=0.6478\cdot\log_{10}m-3.052(R^2=0.9019).$$

This demonstrates that the total mass of SNOMAX is the parameter to dictate the occurrence of ice nucleation in 0.5 ml WFI water regardless of the form of presence of the INA particles, either in a suspension or in a confined space. In FIG. 5, the freezing temperatures was shown in FIG. 3, together with the freezing temperatures of the SNOMAX suspensions (0.005 to 50 mg/ml) prepared in aqueous 10% glycerol solution (dark black data points in FIG. 5), as a function of m in log 10 scale. All the data points follow the same trend very well with a Pearson's correlation coefficient of 0.9783, suggesting a strong positive linear relationship between $T_f$ and $\log_{10}$ m. The curve that best fits all the data points is $$T_f=1.093\cdot\log_{10}(m)-5.771(R^2=0.9571)$$

The data show that the addition of solute did not change the role of the total mass of INA particles as the governing parameter. Therefore, one can increase the total mass of INA particles by adjusting the combination of N, V and $c_{local}$ to enhance the ice nucleation temperature.

The experimental conditions investigated so far used identical sample volume ($V_{sample}$) of 0.5 ml. To investigate the effect of the sample volume on the freezing temperature, Table 4 compares the freezing temperatures of the 0.5 ml and 1.5 ml samples, both of which contain five alginate beads encapsulating 2.5 mg/ml SNOMAX (i.e., having the same total mass). Although 0.5 ml samples have a slightly higher median freezing temperature than their 1.5 ml counterparts, the unpaired t test revealed that there is no statistical difference in the freezing temperature ($T_f$) between the 0.5 ml and 1.5 ml groups, with the only exception for the condition of five beads (30 gauge) in WFI (p=0.0433). In the latter case, more replicates might be necessary to evaluate the difference more accurately since the combination of WFI and less SNOMAX contributes to a wider range of data points than either 10% glycerol or more SNOMAX in WFI. Thus, the total mass of SNOMAX is mostly responsible for dictating the ice nucleation temperature.

TABLE 4

The effect of the sample volume ($V_{sample}$) on the freezing temperature ($T_f$). The local concentration of SNOMAX was 2.5 mg/ml and five beads were added into each sample.

| Medium | Needle size | Median (Min, Max)/° C. | | p-value |
|---|---|---|---|---|
| | | $V_{sample}$ = 0.5 ml | $V_{sample}$ = 1.5 ml | |
| WFI | 30 gauge | −4.0 (−4.3, −3.8) | −4.2 (−4.4, −3.9) | 0.0433 |
| | 18 gauge | −3.4 (−3.8, −2.7) | −3.6 (−3.9, −3.3) | 0.0582 |
| 10% glycerol | 30 gauge | −7.0 (−7.3, −6.7) | −7.3 (−7.4, −6.9) | 0.0527 |
| | 18 gauge | −6.4 (−7.0, −5.9) | −6.7 (−7.6, −6.5) | 0.0817 |

Example 6. Ice Nucleation Formulation with Heavy Water

Figure 7:
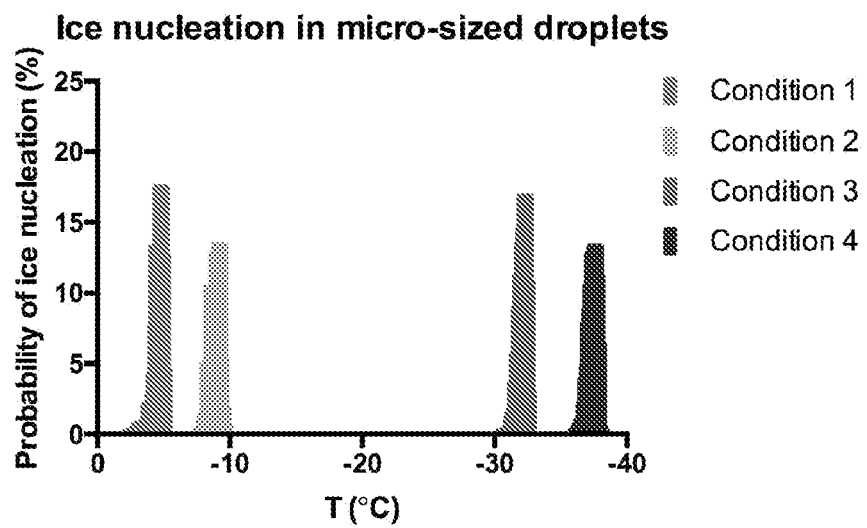
FIG. 7. Probability distribution of ice nucleation temperature using nanodroplet technology, wherein condition 1 is pure heavy water containing 0.1 g/L SNOMAX, condition 2 is pure water containing 0.1 g/L SNOMAX, condition 3 is pure heavy water, and condition 4 is pure water.

A self-nucleating and preservation formulation comprising heavy water and ice nucleating agents was developed with broad applications in the field of cryopreservation. The self-nucleating formulation primarily achieves the following: (1) the initiation of ice nucleation at relatively higher temperature, (2) more uniform ice propagation within a given sample, (3) less variability between different cell preparations, (4) eliminates the need for manual seeding, and (5) exerts a range of biological effects which stabilize biological molecules (e.g. DNA, RNA, proteins, metabolites), exosome (cell-derived vesicles), cells, organs, and organisms for long-term preservation. Using droplet technology, the nucleation temperature of water versus $D_2O$ were measured: the median nucleation temperature increases from −37.4° C. in pure water to −32.1° C. in pure $D_2O$. However, with a combination of heavy water and ice nucleating agents, nucleation temperatures can reach −4.6° C. (FIG. 7), demonstrating the value of using these two synergistically. A potent ice nucleating bacteria *Pseudomonas syringae* (a commercially available preparation known as SNOMAX) was selected for demonstration of feasibility.

Figure 8:
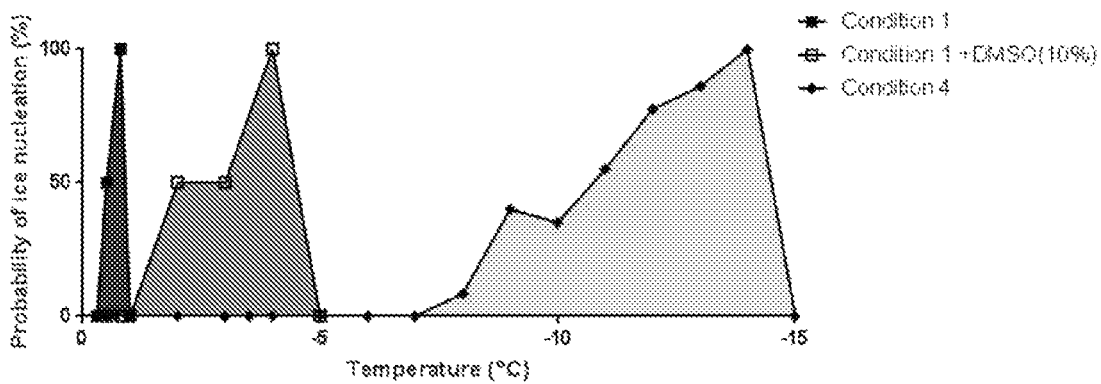
FIG. 8. Probability distribution of ice nucleation temperature in bulk samples (2 mL), wherein condition 1 is 100% heavy water ($D_2O$) containing 0.1 g/L SNOMAX and condition 4 is pure water ($^1H_2O$).
Figure 9:
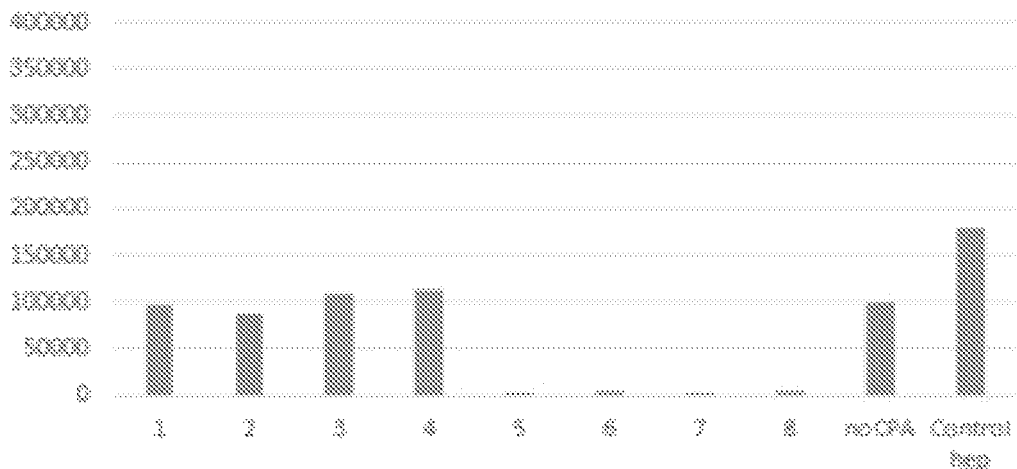
FIG. 9. Number of caspase positive primary hepatocytes (i.e. dead cells) normalized o total cells (percent confluence) following short-term cryopreservation (~2 hours) normalized to total cells.

Since ice nucleation temperature is directly related to volume, the ice nucleation temperature was also analyzed as a function of sample volume. In this system, ice nucleation occurs as early as −0.8° C. in sample volumes of 2 mL with 100% heavy water and 0.1 g/L SNOMAX (FIG. 8). The results demonstrated the positive effect of the self-nucleating formulation on mammalian primary hepatocytes cryopreservation whereby post-thaw viability was up to 143-fold improved over conditions that did not contain the self-nucleating formulation (FIG. 9). The cocktail formulations that were used in FIG. 9 are listed below.

Cocktail 1—University of Wisconsin (UW) solution+3OMG
Cocktail 2—UW+3OMG+Trehalose
Cocktail 3—UW+3OMG+Trehalose+N-acetyl-L-cysteine
Cocktail 4—UW+3OMG+Trehalose+hydrogen sulfide
Cocktail 5—UW+3OMG+heavy water and SNOMAX
Cocktail 6—UW+3OMG+Trehalose+heavy water and SNOMAX
Cocktail 7—UW+3OMG+Trehalose+N-acetyl-L-cysteine+heavy water and SNOMAX
Cocktail 8—UW+3OMG+Trehalose+hydrogen sulfide+heavy water and SNOMAX Cocktail 1 and 5, 2 and 6, 3 and 7, and 4 and 8 are paired experiments whereby 1 through 4 do not contain the self-nucleating formulation and 5 through 8 contain the self-nucleation formulation.

Figure 10:
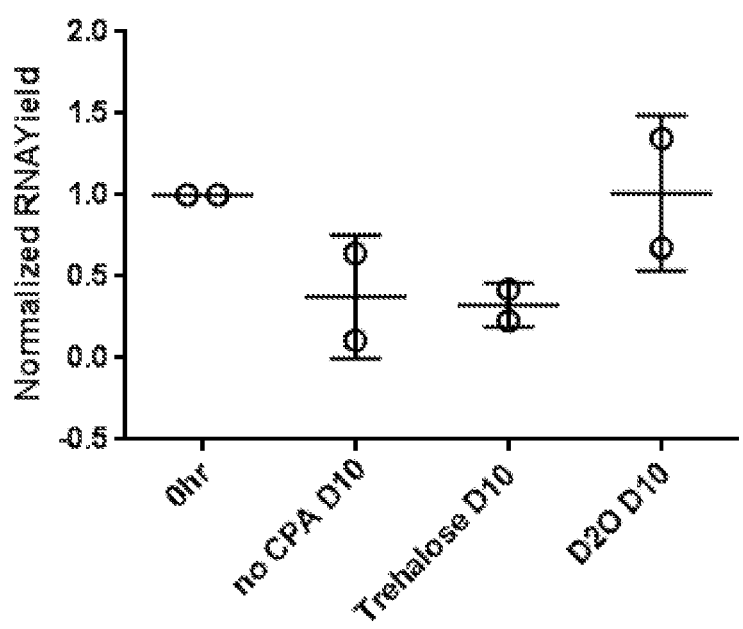
FIG. 10. Yield of RNA extracted from preserved oncosomes stored at −80° C. for ten days. All experimental conditions were normalized to Day 0 yield, showing the relative change in RNA yield as a function of time in storage.

Furthermore, FIG. 10 shows that this formulation can improve RNA yield from cancer cell-derived vesicles (i.e. oncosomes) for the purpose of diagnostics and research.

Example 7. Agarose Hydrogel Particles

Figure 11:
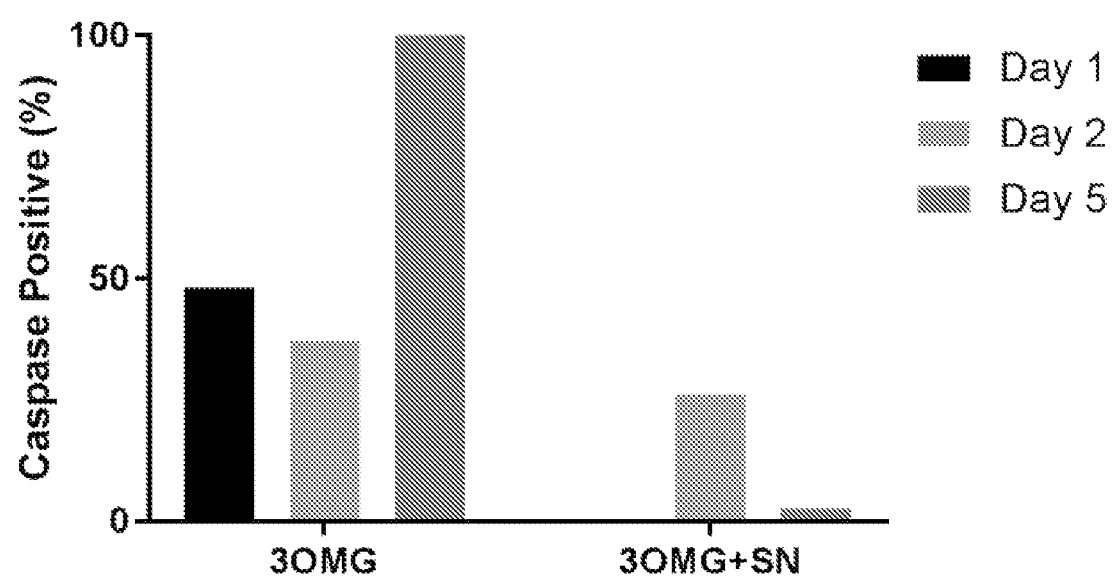
FIG. 11. Ice Nucleating Agents enhance preservation viability after freezing. Fresh primary rat hepatocytes were loaded with 300 mM 3OMG for 2 hours and subjected to a high subzero freeze-thaw protocol either in the presence of an ice nucleator (denoted as "SN") or without. Following the thaw, hepatocytes were plated in a double gel configuration and their viability was tracked for 5 days using Caspase 3/7 (dead stain).

Biocompatible agents with the capacity to nucleate ice can be encapsulated in hydrogel microbeads. The encapsulation of INPs has been proposed as means to have more control over ice propagation, rather than acting as a means to overcome toxicity issues. As evidenced in FIG. 11, which involves SNOMAX, selected INPs had no toxic effects on diverse cell types during equilibrium freezing.

Figures 12A, 12B, 12C, 12D:
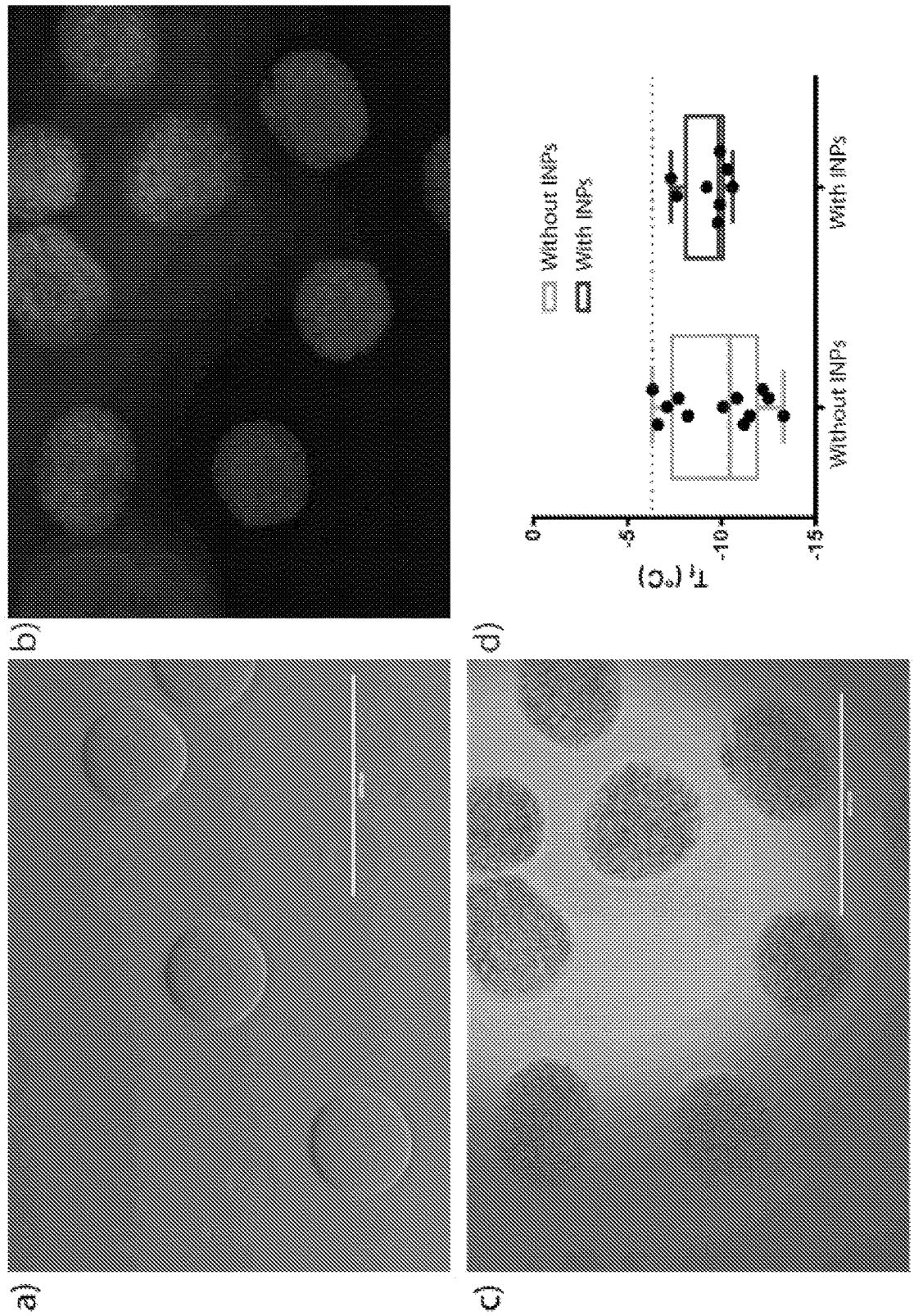
FIG. 12A. Bright field images of INPs encapsulated in agarose hydrogel particles.
FIG. 12B. Hoechst stained INPs contained within hydrogel particles.
FIG. 12C. Frozen encapsulated INPs imaged using a cryostage.
FIG. 12D. Biocompatible INPs can achieve more predictable ice nucleation temperatures.

The encapsulation of ice nucleating particles in hydrogel microbeads was done on a conventional flow focusing microfluidics device. The oil phase was Novec 7500 and the aqueous phase was ~3% agarose solution with or without suspended INPs including SNOMAX, IceStart, or other ice nucleators. The collected hydrogel beads had a core-shell structure. The ice nucleating particles was detained in the hydrogel core and sealed by a layer of pure hydrogel shell. As shown in FIGS. 12A-12D, ice nucleating agents (SNOMAX) were encapsulating in agarose hydrogel particles, and these hydrogel particles reduced variability in ice nucleation temperature. The quality of the core-shell structure was examined by observing the boundary of hydrogel beads (FIG. 12A), comparing the distribution of INPs (stained with Hoechst 33342 for SNOMAX) (FIG. 12B), and characterizing the freezing behavior of encapsulated INPs (FIG. 12C shows frozen INPs in hydrogels). Moreover, preliminary data shows that in the presence of encapsulated INPs ice can form more predictably (FIG. 12D).

Example 8. Engineering Encapsulated Ice Nucleating Agents to Induce Controlled and Uniform Ice Propagation within the Vascular Spaces Encapsulating Various INPs As a continuation of this work, the encapsulation of various INPs such as IceStart™ and silver iodine are also tested. In order to characterize the entrapment within hydrogels, ice nucleators are fluorescently labeled and internal versus external fluorescence are quantified. The purpose is to encapsulate diverse ice nucleating particles and to achieve 80% entrapment within hydrogels with leakage less than 1%.

Characterization of Ice Nucleating Temperatures, Potency, and Improvement in Freezing Survival To evaluate ice nucleation temperature, INPs contained within hydrogel beads are suspended in about 500 μl aqueous solutions. The sample contained in a cryovial are subjected to various cooling ramps in a controlled rate freezer. The ice nucleation temperature facilitated by the INP-contained hydrogel beads is determined by the thermal couple that is immersed in the sample. In order to quantify ice nucleation potency, samples exposed to a cooling rate of 1° C./min in the controlled rate freezer are examined every 1° C. until samples are all frozen. The number of unfrozen samples are counted as a function of temperature. In all cases, the corresponding ice nucleator which is not encapsulated is used in order to ascertain the loss in potency due to encapsulation. Following this detailed characterization, the INP-contained hydrogel beads are used in the cryo-preservation of both rat and human primary hepatocytes. Primary cells are plated in the double gel configuration since this configuration represents a physiologically relevant tissue structure that maintains long-term expression of hepatocellular function. Moreover, in this engineered construct, a collagen gel separates the parenchyma from the cryopreservation solution, similar to the in vivo situation whereby hepatocytes are separated from INP-contained hydrogel beads by a supporting tissue barrier. The INP-contained hydrogel beads are added into the existing cryopreservation formulation for primary hepatocytes. The post-thaw viability and long-term function are determined for conditions with and without the presence of INPs. Encapsulated ice nucleating particles can achieve an ice nucleation temperature and potency which is within 2-3° C. of the free ice nucleator. Moreover, a 30% increase in cell viability of hepatocytes plated in the double configuration is expected in the presence of the encapsulated ice nucleating particles, as compared to without ice nucleators.

Tuning the Size of Encapsulated Ice Nucleating Agents in Hydrogels

The ability to tune the size of the INP-contained hydrogel beads is advantageous because it can promote the uniform distribution of ice nucleators throughout various freezing containers and throughout the complex vasculature networks in the organ. This is critical since uniform ice nucleation ensures certain regions of the organ are not supercooled and there is no sudden break down of the unstable state. In order to accomplish this, devices with varying microchannel dimensions are provided. Each microchannel reflects a physiologically-relevant sized vasculature space. Further, the microfluidic model also incorporates a parenchymal component to allow researchers to evaluate INP distribution and ensure ice propagation is limited to the vascular spaces.

A liver version of existing heart-on-a-chip devices can be used. This device incorporates a vasculature and parenchymal component to model drug toxicity. Ice propagation is characterized as a function of vasculature size, ice nucleation temperature, and size of the INP-contained beads. Using staining protocols similar to FIG. 12B, distribution of INPs throughout microfluidic vasculature networks is visualized and quantified.

Scale-Up Validation and Optimization in Whole Rat and Human Livers.

Figure 13B:
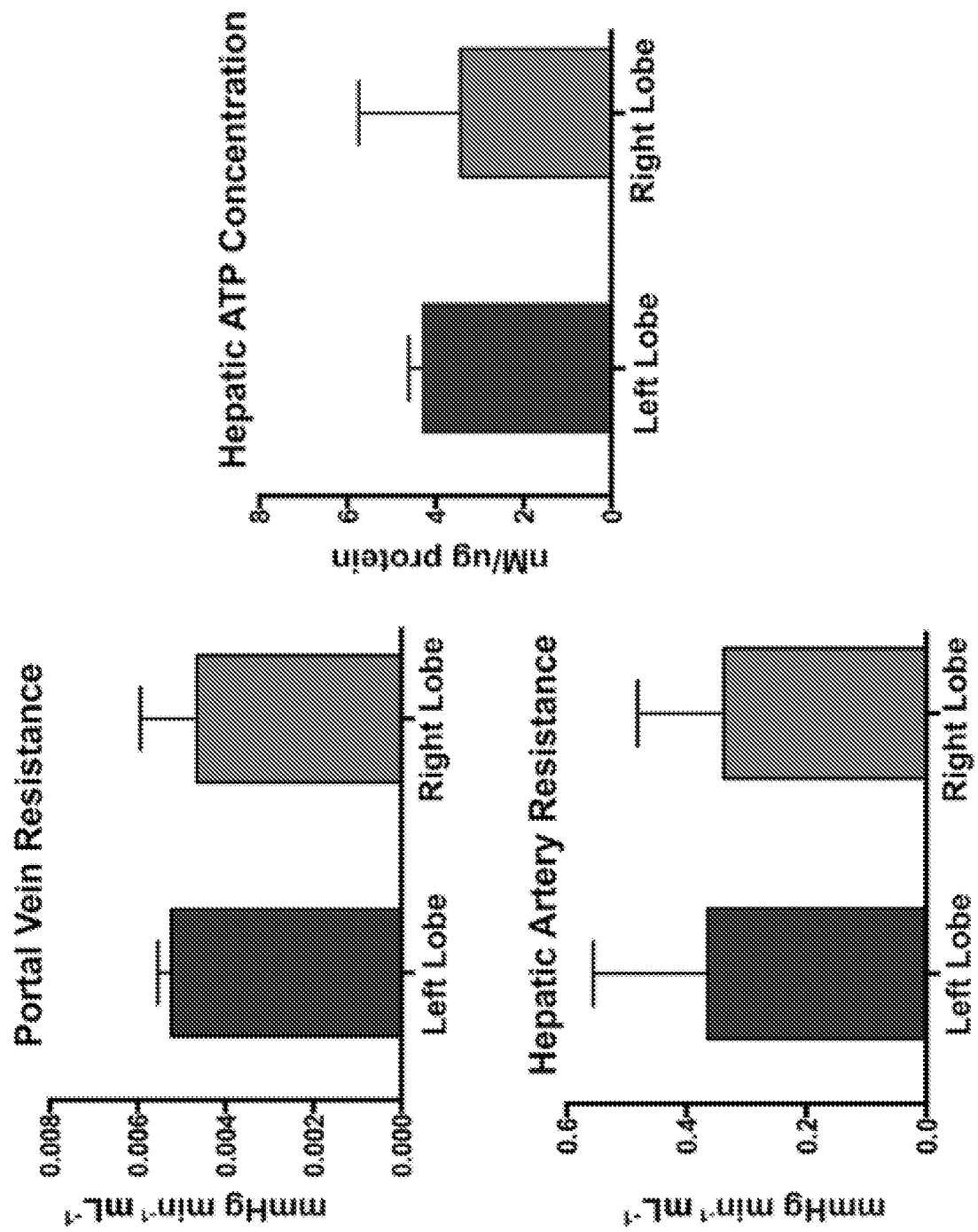
FIG. 13B. Hemodynamics of the liver lobes (monitored and recorded every 30 min during perfusion).

The capacity of the INP-contained hydrogel beads to perfuse throughout the whole organ and remain exclusively within the vasculature is tested. The perfusion system that can distribute INP-contained hydrogel beads throughout the organ is used. Initial experiments begin with rat whole liver. A split-liver model can be used for human liver (FIGS. 13A-13B). In FIG. 13A, the right and left portal veins were isolated just above the bifurcation and divided. The graft was transected in the mid-plane of the liver dividing it into the anatomic right lobe and the left lobe. Small penetrating vessels and biliary radicles were suture ligated or clipped as required. MHV branches to segments 5 and 8 were divided and left untied to insure unimpeded drainage of the right lobe. The left portal vein, the left hepatic artery and the left bile duct were divided and cannulated. The cava vein was preserved with the right lobe graft allowing maximized outflow of the right lobe graft. The right-sided hilar structures were cannulated as well. Each lobe was weighed and flushed with 1 L Lactated Ringers prior to being connected to the perfusion device. In FIG. 13B, samples of the perfusion fluid were collected every 30 min for further biochemical analysis. Both lobes had stable hemodynamics as shown by the portal vein and hepatic artery resistance, which were comparable to each other (p>0.1 for all comparisons). Liver tissue biopsies were collected and snap frozen for ATP measurement on an hourly basis. The mean total hepatic ATP concentration in each lobe was comparable with each other. PV (Portal Vein), HA (Hepatic Artery), BD (Bile Duct).

The ability of engineered INPs to initiate ice in a predictable manner as close as possible to the equilibrium freezing point is assessed. Whole rat livers or split human livers can be perfused with or without the encapsulated INP. To measure the ice nucleation temperature, a thermocouple can be immersed in the sample. To assess distribution of INPs, fluorescent markers can be co-encapsulated within the beads. Biopsies from about 9 different locations per liver or lobe are obtained, and histology is performed to identify any INP penetration into the parenchyma, distribution between central and portal areas etc. The results are quantified with ImageJ.

Since imaging the ice nucleation is not straightforward, the viability and cell membrane integrity of cells in parenchyma are measured and compared to control tissues (fresh and cryopreserved). Following the freeze-thaw protocol, livers are subjected to SNMP and needle biopsies are collected to compare ice nucleation with and without uniformly perfused INPs. These needle biopsies are also assessed for ATP and other energy cofactors (ADP, AMP, NAD/NADH, NADP/NAPDH). The purpose is to uniformly distribute encapsulated ice nucleating particles and to observe corresponding increases in the viability of whole organs post freeze-thaw.

This example provides methods to uniformly nucleate ice throughout the vasculature to improve freezing survival, while also serving as a means to minimize the probability of intracellular ice formation. INP-contained hydrogel beads are easily perfused throughout the organ, and can be completely removed after storage. The expected outcome is encapsulated INPs can provide significant improvements on primary hepatocyte and endothelial cell viability (>90% cell viability of all cells) after high subzero cryopreservation (>3 days).

Some types of nanoparticles have already been tested for their effectiveness in improving the nucleation of cryoprotectant solutions. A wide range of nanoparticles are also tested. It is expected that nanoparticle can improve the ice nucleation activity of nanoparticles by tethering short peptide sequences to the surface of nanoparticles.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

REFERENCES

[1] N. Cochet, P. Widehem, Ice crystallization by *Pseudomonas syringae*, Appl Microbiol Biotechnol, 54 (2000) 153-161.

[2] M. Dalvi-Isfahan, N. Hamdami, E. Xanthakis, A. Le-Bail, Review on the control of ice nucleation by ultrasound waves, electric and magnetic fields, J. Food Eng., 195 (2017) 222-234.

[3] G. Edwards, L. Evans, V. La Mer, Ice nucleation by monodisperse silver iodide particles, J Colloid Sci, 17 (1962) 749-758.

[4] B. J. Fuller, Cryoprotectants: the essential antifreezes to protect life in the frozen state, Cryo Letters, 25 (2004) 375-388.

[5] I. Garbayo, R. León, C. Vilchez, Diffusion characteristics of nitrate and glycerol in alginate, Colloids Surf., B, 25 (2002) 1-9.

[6] R. Geidobler, I. Konrad, G. Winter, Can Controlled Ice Nucleation Improve Freeze-Drying of Highly-Concentrated Protein Formulations?, J. Pharm. Sci., 102 (2013) 3915-3919.

[7] R. Geidobler, G. Winter, Controlled ice nucleation in the field of freeze-drying: fundamentals and technology review, Eur. J. Pharm. Biopharm., 85 (2013) 214-222.

[8] X. Han, H. Ma, C. Wilson, J. Critser, Effects of nanoparticles on the nucleation and devitrification temperatures of polyol cryoprotectant solutions, Microfluid Nanofluidics, 4 (2008) 357-361.

[9] C. L. Harris, M. Toner, A. Hubel, E. G. Cravalho, M. L. Yarmush, R. G. Tompkins, Cryopreservation of isolated hepatocytes: intracellular ice formation under various chemical and physical conditions, Cryobiology, 28 (1991) 436-444.

[10] P. Hobbs, Ice Physics, Clarendon Press, Oxford, 1974.

[11] A. Holowczenko, S. A. Schoch, H. W. Sibley, Water freezing enhancement for thermal storage brine tube, United States patent, 1988.

[12] S. Hua, H. Ma, X. Li, H. Yang, A. Wang, pH-sensitive sodium alginate/poly (vinyl alcohol) hydrogel beads prepared by combined Ca2+ crosslinking and freeze-thawing cycles for controlled release of diclofenac sodium, Int. J. Biol. Macromolec., 46 (2010) 517-523.

[13] H. Kiani, D.-W. Sun, A. Delgado, Z. Zhang, Investigation of the effect of power ultrasound on the nucleation of water during freezing of agar gel samples in tubing vials, Ultrason Sonochem, 19 (2012) 576-581.

[14] J. Lee, D. Cha, H. J. Park, Survival of freeze-dried *Lactobacillus bulgaricus* KFRI 673 in chitosan-coated calcium alginate microparticles, J. Agric. Food Chem, 52 (2004) 7300-7305.

[15] F. Lüönd, O. Stetzer, A. Welti, U. Lohmann, Experimental study on the ice nucleation ability of size-selected kaolinite particles in the immersion mode, J Geophys Res-Atmos, 115 (2010).

[16] G. J. Morris, E. Acton, Controlled ice nucleation in cryopreservation—a review, Cryobiology, 66 (2013) 85-92.

[17] B. Murray, D. O'sullivan, J. Atkinson, M. Webb, Ice nucleation by particles immersed in supercooled cloud droplets, Chem. Soc. Rev., 41 (2012) 6519-6554.

[18] M. Orlowska, M. Havet, A. Le-Bail, Controlled ice nucleation under high voltage DC electrostatic field conditions, Food Res Int, 42 (2009) 879-884.

[19] R. Pandey, K. Usui, R. A. Livingstone, S. A. Fischer, J. Pfaendtner, E. H. Backus, Y. Nagata, J. Frohlich-Nowoisky, L. Schmüser, S. Mauri, Ice-nucleating bacteria control the order and dynamics of interfacial water, Sci. Adv., 2 (2016) e1501630.

[20] A. Petersen, H. Schneider, G. Rau, B. Glasmacher, A new approach for freezing of aqueous solutions under active control of the nucleation temperature, Cryobiology, 53 (2006) 248-257.

[21] B. Riechers, F. Wittbracht, A. Witten, T. Koop, The homogeneous ice nucleation rate of water droplets produced in a microfluidic device and the role of temperature uncertainty, Phys Chem Chem Phys, 15 (2013) 5873-5887.

[22] F. S. Trad, M. Toner, J. D. Biggers, Effects of cryoprotectants and ice-seeding temperature on intracellular freezing and survival of human oocytes, Hum Reprod, 14 (1999) 1569-1577.

[23] B. Vonnegut, The nucleation of ice formation by silver iodide, J. Appl. Phys., 18 (1947) 593-595.

[24] L. Weng, S. N. Tessier, K. Smith, J. F. Edd, S. L. Stott, M. Toner, Bacterial Ice Nucleation in Monodisperse $D_2O$ and $H_2O$-in-Oil Emulsions, Langmuir, 32 (2016) 9229-9236.

[25] T. F. Whale, M. Rosillo-Lopez, B. J. Murray, C. G. Salzmann, Ice Nucleation Properties of Oxidized Carbon Nanomaterials, J. Phys. Chem. Lett., 6 (2015) 3012-3016.

[26] B. Xu, M. Zhang, B. Bhandari, X. Cheng, Influence of power ultrasound on ice nucleation of radish cylinders during ultrasound-assisted immersion freezing, Int. J. Refrig., 46 (2014) 1-8.

[27] J. Zamecnik, V. Skladal, V. Kudela, Ice nucleation by immobilized ice nucleation active bacteria, Cryo Letters, 12 (1991) 149-154.

[28] Baran S W, Ware C B. Cryopreservation of rhesus macaque embryonic stem cells. Stem Cells Dev. 2007; 16(2):339-44.

[29] Enright, J T. Heavy water slows biological timing processes. Z vergl Physiologie. 1971; 72: 1-16.

[30] Fahy G M, Wowk B, W u J. Cryopreservation of complex systems: the missing link in the regenerative medicine supply chain. Rejuvenation Res. 2006; 9: 279-91.

[31] Ikeda M, Hirono M, Kishio M, Matsuura J, Sakakibara M, Yoshioka T. Examination of microgravity effects on spontaneous Ca2+ oscillations in AtT20 pituitary cells using heavy water. J Gravit Physiol. 2000; 7(2): P63-4.

[32] Kushner D J, Baker A, Dunstall T G. Pharmacological uses and perspectives of heavy water and deuterated compounds. Can J Physiol Pharmacol. 1999; 77(2):79-88.

[33] Lanza R P, Cibelli J B, West M D, Dorff E, Tauer C, Green R M. The ethical reasons for stem cell research. Science. 2001; 292(5520): 1299.

[34] Lanza R P, Chung H Y, Yoo J J, Wettstein P J, Blackwell C, Borson N, Hofmeister E, Schuch G, Soker S, Moraes C T, West M D, Atala A. Generation of histocompatible tissues using nuclear transplantation. Nat. Biotechnol. 2002; 20:689-696.

[35] Lin P S, Hefter K, Ho K C. Modification of membrane function, protein synthesis, and heat killing effect in cultured Chinese hamster cells by glycerol and D2O1. Cancer Res. 1982; 44(12 Pt 1): 5776-84.

[36] Schroeter D, Lamprecht J, Eckhardt R, Futterman G, Paweletz N. Deuterium oxide (heavy water) arrests the cell cycle of PtK2 cells during interphase. Eur J Cell Biol. 1992; 58(2):365-70.

[37] Stöckel P, Weidinger I M, Baumgartel H, Leisner T. Rates of homogeneous ice nucleation in levitated H2O and D2O droplets. J Phys Chem A. 2005; 109(11):2540-6.

[38] Verheyden B, Andries K, Rombaut B. Capsid and RNA stabilisation of the oral polio vaccine. Vaccine. 2001; 19(15-16):1899-905.

[39] Wakayama K, Fukai M, Yamashita K, Kimura T, Hirokata G, Shibasaki S, Fukumori D, Haga S, Sugawara M, Suzuki T, Taniguchi M, Shimamura T, Furukawa H, Ozaki M, Kamiyama T, Todo S. Successful transplantation of rat hearts subjected to extended cold preservation with a novel preservation solution. Transpl Int. 2012; 25(6):696-706.

[40] Wolanczyk J P, Storey K B, Baust J G. Ice nucleating activity in the blood of the freeze-tolerant frog, *Rana sylvatica*. Cryobiology. 1990; 27(3):328-35.

[41] Zachariassen K E, Kristiansen E. "Ice nucleation and antinucleation in nature." Cryobiology. 41(4):257-79 (2000).

What is claimed is:

1. A method of preserving a biological sample, the method consisting of:
   (a) perfusing or contacting a biological sample with a composition comprising a hydrogel particle and an ice nucleating agent, wherein the ice nucleating agent is enclosed in the hydrogel particle;
   (b) freezing the biological sample with the composition; and
   (c) cryopreserving the biological sample at a temperature between 0° C. and −15° C.

2. The method of claim 1, wherein the biological sample comprises a cell.

3. The method of claim 1, wherein the biological sample comprises a tissue sample.

4. The method of claim 1, wherein the biological sample comprises exosomes or microvesicles.

5. The method of claim 1, wherein the composition further comprises a cryoprotectant.

6. The method of claim 5, wherein the cryoprotectant comprises any one or more of dimethylsulfoxide, ethylene glycol, propylene glycol, propane-1,2-diol, 1,2-propanediol, 3-O-methyl-glucose, or glycerol.

7. The method of claim 5, wherein the cryoprotectant comprises any one or more of sucrose, trehalose, stachyose, raffinose, or a polymer.

8. The method of claim 1, wherein the ice nucleating agent comprises proteins extracted from *Pseudomonas syringae*.

9. The method of claim 1, wherein the ice nucleating agent is silver iodide, or wherein the ice nucleating agent is a protein, a carbohydrate, or a phospholipid.

10. The method of claim 1, wherein the concentration of the ice nucleating agent in the hydrogel particle is greater than 0.5 mg/ml.

11. The method of claim 1, wherein the hydrogel particle comprises an agarose hydrogel particle or an alginate hydrogel particle.

12. The method of claim 1, wherein the hydrogel particle has a diameter less than 4 mm.

13. The method of claim 1, wherein the hydrogel particle has a volume less than 15 μl.

14. The method of claim 1, wherein the hydrogel particle further comprises heavy water.

15. The method of claim 1, wherein the ice nucleating agent is present in a sufficient amount within the hydrogel particle to increase the ice nucleation temperature of the biological sample to higher than −8° C.

16. The method of claim 1, wherein the biological sample is an organ.

17. The method of claim 16, wherein the organ is a liver, a heart, or a kidney.

18. The method of claim 16, wherein the method minimizes ischemia-reperfusion damage of the organ.

19. The method of claim 1, wherein the biological sample is cryopreserved at a temperature between −5° C. and −15° C.

* * * * *

UNITED STATES PATENT AND TRADEMARK OFFICE
CERTIFICATE OF CORRECTION

| | | |
|---|---|---|
| PATENT NO. | : 11,477,981 B2 | Page 1 of 1 |
| APPLICATION NO. | : 16/313714 | |
| DATED | : October 25, 2022 | |
| INVENTOR(S) | : Mehmet Toner et al. | |

It is certified that error appears in the above-identified patent and that said Letters Patent is hereby corrected as shown below:

In the Specification

In Column 1, Line 8 (approx.), delete "PCT/0S2017/040012," and insert -- PCT/US2017/040012, --

Signed and Sealed this
Twenty-fourth Day of January, 2023

Katherine Kelly Vidal
*Director of the United States Patent and Trademark Office*

SEQUENCE LISTING

```
<160> NUMBER OF SEQ ID NOS: 2

<210> SEQ ID NO 1
<211> LENGTH: 1200
<212> TYPE: PRT
<213> ORGANISM: Pseudomonas syringae

<400> SEQUENCE: 1

Met Asn Leu Asp Lys Ala Leu Val Leu Arg Thr Cys Ala Asn Asn Met
1               5                   10                  15

Ala Asp His Cys Gly Leu Ile Trp Pro Ala Ser Gly Thr Val Glu Ser
            20                  25                  30

Arg Tyr Trp Gln Ser Thr Arg Arg His Glu Asn Gly Leu Val Gly Leu
        35                  40                  45

Leu Trp Gly Ala Gly Thr Ser Ala Phe Leu Ser Val His Ala Asp Ala
    50                  55                  60

Arg Trp Ile Val Cys Glu Val Ala Val Ala Asp Ile Ile Ser Leu Glu
65                  70                  75                  80

Glu Pro Gly Met Val Lys Phe Pro Arg Ala Glu Val Val His Val Gly
                85                  90                  95

Asp Arg Ile Ser Ala Ser His Phe Ile Ser Ala Arg Gln Ala Asp Pro
            100                 105                 110

Ala Ser Thr Ser Thr Ser Thr Leu Thr Pro Met Pro Thr Ala Ile Pro
        115                 120                 125

Thr Pro Met Pro Ala Val Ala Ser Val Thr Leu Pro Val Ala Glu Gln
    130                 135                 140

Ala Arg His Glu Val Phe Asp Val Ala Ser Val Ser Ala Ala Ala Ala
145                 150                 155                 160

Pro Val Asn Thr Leu Pro Val Thr Thr Pro Gln Asn Val Gln Thr Ala
                165                 170                 175

Thr Tyr Gly Ser Thr Leu Ser Gly Asp Asn His Ser Arg Leu Ile Ala
            180                 185                 190

Gly Tyr Gly Ser Asn Glu Thr Ala Gly Asn His Ser Asp Leu Ile Ala
        195                 200                 205

Gly Tyr Gly Ser Thr Gly Thr Ala Gly Ser Asp Ser Trp Leu Val Ala
    210                 215                 220

Gly Tyr Gly Ser Thr Gln Thr Ala Gly Gly Asp Ser Ala Leu Thr Ala
225                 230                 235                 240

Gly Tyr Gly Ser Thr Gln Thr Ala Arg Glu Gly Ser Asn Leu Thr Ala
                245                 250                 255

Gly Tyr Gly Ser Thr Gly Thr Ala Gly Ser Asp Ser Leu Ile Ala
            260                 265                 270

Gly Tyr Gly Ser Thr Gln Thr Ser Gly Asp Ser Ser Leu Thr Ala
        275                 280                 285

Gly Tyr Gly Ser Thr Gln Thr Ala Gln Glu Gly Ser Asn Leu Thr Ala
    290                 295                 300

Gly Tyr Gly Ser Thr Gly Thr Ala Gly Ser Asp Ser Ser Leu Ile Ala
305                 310                 315                 320

Gly Tyr Gly Ser Thr Gln Thr Ser Gly Gly Asp Ser Ser Leu Thr Ala
                325                 330                 335

Gly Tyr Gly Ser Thr Gln Thr Ala Gln Glu Gly Ser Asn Leu Thr Ala
```

-continued

```
                340                 345                 350
Gly Tyr Gly Ser Thr Gly Thr Ala Gly Val Asp Ser Ser Leu Ile Ala
            355                 360                 365
Gly Tyr Gly Ser Thr Gln Thr Ser Gly Ser Asp Ser Ala Leu Thr Ala
            370                 375                 380
Gly Tyr Gly Ser Thr Gln Thr Ala Gln Glu Gly Ser Asn Leu Thr Ala
385                 390                 395                 400
Gly Tyr Gly Ser Thr Gly Thr Ala Gly Ser Asp Ser Ser Leu Ile Ala
            405                 410                 415
Gly Tyr Gly Ser Thr Gln Thr Ser Gly Ser Asp Ser Ser Leu Thr Ala
            420                 425                 430
Gly Tyr Gly Ser Thr Gln Thr Ala Gln Glu Gly Ser Ile Leu Thr Ala
            435                 440                 445
Gly Tyr Gly Ser Thr Gly Thr Ala Gly Val Asp Ser Ser Leu Ile Ala
            450                 455                 460
Gly Tyr Gly Ser Thr Gln Thr Ser Gly Ser Asp Ser Ala Leu Thr Ala
465                 470                 475                 480
Gly Tyr Gly Ser Thr Gln Thr Ala Gln Glu Gly Ser Asn Leu Thr Ala
            485                 490                 495
Gly Tyr Gly Ser Thr Gly Thr Ala Gly Ala Asp Ser Ser Leu Ile Ala
            500                 505                 510
Gly Tyr Gly Ser Thr Gln Thr Ser Gly Ser Glu Ser Ser Leu Thr Ala
            515                 520                 525
Gly Tyr Gly Ser Thr Gln Thr Ala Arg Glu Gly Ser Thr Leu Thr Ala
            530                 535                 540
Gly Tyr Gly Ser Thr Gly Thr Ala Gly Ala Asp Ser Ser Leu Ile Ala
545                 550                 555                 560
Gly Tyr Gly Ser Thr Gln Thr Ser Gly Ser Glu Ser Ser Leu Thr Ala
            565                 570                 575
Gly Tyr Gly Ser Thr Gln Thr Ala Gln Gln Gly Ser Val Leu Thr Ser
            580                 585                 590
Gly Tyr Gly Ser Thr Gln Thr Ala Gly Ala Ala Ser Asn Leu Thr Thr
            595                 600                 605
Gly Tyr Gly Ser Thr Gly Thr Ala Gly His Glu Ser Phe Ile Ile Ala
            610                 615                 620
Gly Tyr Gly Ser Thr Gln Thr Ala Gly His Lys Ser Ile Leu Thr Ala
625                 630                 635                 640
Gly Tyr Gly Ser Thr Gln Thr Ala Arg Asp Gly Ser Asp Leu Ile Ala
            645                 650                 655
Gly Tyr Gly Ser Thr Gly Thr Ala Gly Ser Gly Ser Ser Leu Ile Ala
            660                 665                 670
Gly Tyr Gly Ser Thr Gln Thr Ala Ser Tyr Arg Ser Met Leu Thr Ala
            675                 680                 685
Gly Tyr Gly Ser Thr Gln Thr Ala Arg Glu His Ser Asp Leu Val Thr
            690                 695                 700
Gly Tyr Gly Ser Thr Ser Thr Ala Gly Ser Asn Ser Ser Leu Ile Ala
705                 710                 715                 720
Gly Tyr Gly Ser Thr Gln Thr Ala Gly Phe Lys Ser Ile Leu Thr Ala
            725                 730                 735
Gly Tyr Gly Ser Thr Gln Thr Ala Gln Glu Arg Thr Ser Leu Val Ala
            740                 745                 750
Gly Tyr Gly Ser Thr Ser Thr Ala Gly Tyr Ser Ser Ser Leu Ile Ala
            755                 760                 765
```

-continued

```
Gly Tyr Gly Ser Thr Gln Thr Ala Gly Tyr Glu Ser Thr Leu Thr Ala
            770                 775                 780

Gly Tyr Gly Ser Thr Gln Thr Ala Gln Glu Asn Ser Ser Leu Thr Thr
785                 790                 795                 800

Gly Tyr Gly Ser Thr Ser Thr Ala Gly Tyr Ser Ser Leu Ile Ala
            805                 810                 815

Gly Tyr Gly Ser Thr Gln Thr Ala Gly Tyr Glu Ser Thr Leu Thr Ala
            820                 825                 830

Gly Tyr Gly Ser Thr Gln Thr Ala Gln Glu Arg Ser Asp Leu Val Thr
            835                 840                 845

Gly Tyr Gly Ser Thr Ser Thr Ala Gly Tyr Ala Ser Ser Leu Ile Ala
            850                 855                 860

Gly Tyr Gly Ser Thr Gln Thr Ala Gly Tyr Glu Ser Thr Leu Thr Ala
865                 870                 875                 880

Gly Tyr Gly Ser Thr Gln Thr Ala Gln Glu Asn Ser Ser Leu Thr Thr
            885                 890                 895

Gly Tyr Gly Ser Thr Ser Thr Ala Gly Phe Ala Ser Ser Leu Ile Ser
            900                 905                 910

Gly Tyr Gly Ser Thr Gln Thr Ala Gly Tyr Lys Ser Thr Leu Thr Ala
            915                 920                 925

Gly Tyr Gly Ser Thr Gln Thr Ala Glu Tyr Gly Ser Ser Leu Thr Ala
            930                 935                 940

Gly Tyr Gly Ser Thr Ala Thr Ala Gly Gln Asp Ser Ser Leu Ile Ala
945                 950                 955                 960

Gly Tyr Gly Ser Ser Leu Thr Ser Gly Ile Arg Ser Phe Leu Thr Ala
            965                 970                 975

Gly Tyr Gly Ser Thr Leu Ile Ala Gly Leu Arg Ser Val Leu Ile Ala
            980                 985                 990

Gly Tyr Gly Ser Ser Leu Thr Ser  Gly Val Arg Ser Thr  Leu Thr Ala
            995                 1000                1005

Gly Tyr  Gly Ser Asn Gln Ile  Ala Ser Tyr Gly Ser  Ser Leu Ile
            1010                1015                1020

Ala Gly His Glu Ser Ile Gln  Val Ala Gly Asn Lys  Ser Met Leu
            1025                1030                1035

Ile Ala Gly Lys Gly Ser Ser  Gln Thr Ala Gly Phe  Arg Ser Thr
            1040                1045                1050

Leu Ile Ala Gly Ala Gly Ser  Val Gln Leu Ala Gly  Asp Arg Ser
            1055                1060                1065

Arg Leu  Ile Ala Gly Ala Asp  Ser Asn Gln Thr Ala  Gly Asp Arg
            1070                1075                1080

Ser Lys  Leu Leu Ala Gly Asn  Asn Ser Tyr Leu Thr  Ala Gly Asp
            1085                1090                1095

Arg Ser  Lys Leu Thr Gly Gly  His Asp Cys Thr Leu  Met Ala Gly
            1100                1105                1110

Asp Gln  Ser Arg Leu Thr Ala  Gly Lys Asn Ser Val  Leu Thr Ala
            1115                1120                1125

Gly Ala  Arg Ser Lys Leu Ile  Gly Ser Glu Gly Ser  Thr Leu Ser
            1130                1135                1140

Ala Gly  Glu Asp Ser Ile Leu  Ile Phe Arg Leu Trp  Asp Gly Lys
            1145                1150                1155

Arg Tyr  Arg Gln Leu Val Ala  Arg Thr Gly Glu Asn  Gly Val Glu
            1160                1165                1170
```

```
Ala Asp Ile Pro Tyr Tyr Val Asn Glu Asp Asp Ile Val Asp
    1175            1180            1185

Lys Pro Asp Glu Asp Asp Trp Ile Glu Val Lys
    1190            1195            1200

<210> SEQ ID NO 2
<211> LENGTH: 48
<212> TYPE: PRT
<213> ORGANISM: Artificial Sequence
<220> FEATURE:
<223> OTHER INFORMATION: repetitive domain
<220> FEATURE:
<221> NAME/KEY: MISC_FEATURE
<222> LOCATION: (7)..(7)
<223> OTHER INFORMATION: x = any amino acid
<220> FEATURE:
<221> NAME/KEY: MISC_FEATURE
<222> LOCATION: (11)..(12)
<223> OTHER INFORMATION: x = any amino acid
<220> FEATURE:
<221> NAME/KEY: MISC_FEATURE
<222> LOCATION: (23)..(23)
<223> OTHER INFORMATION: x = any amino acid
<220> FEATURE:
<221> NAME/KEY: MISC_FEATURE
<222> LOCATION: (27)..(28)
<223> OTHER INFORMATION: x = any amino acid
<220> FEATURE:
<221> NAME/KEY: MISC_FEATURE
<222> LOCATION: (30)..(30)
<223> OTHER INFORMATION: x = any amino acid
<220> FEATURE:
<221> NAME/KEY: MISC_FEATURE
<222> LOCATION: (39)..(39)
<223> OTHER INFORMATION: x = any amino acid
<220> FEATURE:
<221> NAME/KEY: MISC_FEATURE
<222> LOCATION: (43)..(44)
<223> OTHER INFORMATION: x = any amino acid
<220> FEATURE:
<221> NAME/KEY: MISC_FEATURE
<222> LOCATION: (46)..(46)
<223> OTHER INFORMATION: x = any amino acid

<400> SEQUENCE: 2

Ala Gly Tyr Gly Ser Thr Xaa Thr Ala Gly Xaa Xaa Ser Ser Leu Ile
1               5                   10                  15

Ala Gly Tyr Gly Ser Thr Xaa Thr Ala Gly Xaa Xaa Ser Xaa Leu Thr
            20                  25                  30

Ala Gly Tyr Gly Ser Thr Xaa Thr Ala Gln Xaa Xaa Ser Xaa Leu Thr
        35                  40                  45
```